United States Patent
Jeong et al.

(10) Patent No.: US 10,819,173 B2
(45) Date of Patent: Oct. 27, 2020

(54) MOVEABLE CORE-TYPE RECIPROCATING MOTOR AND RECIPROCATING COMPRESSOR HAVING A MOVEABLE CORE-TYPE RECIPROCATING MOTOR

(71) Applicant: LG ELECTRONICS INC., Seoul (KR)

(72) Inventors: Sangsub Jeong, Seoul (KR); Jaebeum Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 15/865,684

(22) Filed: Jan. 9, 2018

(65) Prior Publication Data
US 2018/0198357 A1   Jul. 12, 2018

(30) Foreign Application Priority Data

Jan. 10, 2017   (KR) .................. 10-2017-0003723

(51) Int. Cl.
*H02K 1/34* (2006.01)
*H02K 33/02* (2006.01)
(Continued)

(52) U.S. Cl.
CPC ............. *H02K 1/34* (2013.01); *F04B 35/045* (2013.01); *F04B 39/0016* (2013.01);
(Continued)

(58) Field of Classification Search
CPC .......... H02K 1/34; H02K 1/141; H02K 1/145; H02K 1/182; H02K 7/14; H02K 33/00;
(Continued)

(56) References Cited

U.S. PATENT DOCUMENTS 7,382,067 B2 * 6/2008 Nakagawa ............ H01F 7/1615
                                                      310/15
7,626,289 B2 * 12/2009 Her ....................... F04B 35/045
                                                      310/12.04
(Continued)

FOREIGN PATENT DOCUMENTS

EP      1 912 319      4/2008
JP      11-187638      7/1999
(Continued)

OTHER PUBLICATIONS

International Search Report dated Apr. 19, 2018.
European Search Report dated May 28, 2018.

*Primary Examiner* — Maged M Almawri
(74) *Attorney, Agent, or Firm* — Ked & Associates LLP

(57) ABSTRACT

A movable core-type reciprocating motor and a compressor having a movable core-type reciprocating motor are provided. The motor may include a stator including an inner stator and an outer stator; a magnet coil wound between the inner stator and the outer stator; a magnet fixed to at least one of the inner stator or the outer stator so as to be at least partially positioned within a range of the air gap; and a mover including at least one movable core disposed in the air gap and made of a magnetic material to perform a reciprocation movement with respect to the stator and the magnet and a connection member made of a non-magnetic material and configured to support the at least one movable core.

18 Claims, 25 Drawing Sheets

(51) Int. Cl.
  F04B 53/12    (2006.01)
  H02K 1/18     (2006.01)
  F04B 53/16    (2006.01)
  F04B 39/00    (2006.01)
  H02K 1/14     (2006.01)
  H02K 33/16    (2006.01)
  F04B 35/04    (2006.01)
  H02K 7/14     (2006.01)
  H02K 33/00    (2006.01)

(52) U.S. Cl.
  CPC ........ *F04B 39/0061* (2013.01); *F04B 53/125* (2013.01); *F04B 53/16* (2013.01); *H02K 1/141* (2013.01); *H02K 1/145* (2013.01); *H02K 1/182* (2013.01); *H02K 7/14* (2013.01); *H02K 33/00* (2013.01); *H02K 33/02* (2013.01); *H02K 33/16* (2013.01)

(58) Field of Classification Search
  CPC ........ H02K 33/02; H02K 33/16; H02K 16/00; H02K 16/04; H02K 7/1807; H02K 7/1815; H02K 7/1876; H02K 35/00; F04B 35/045; F04B 39/0016; F04B 39/0061; F04B 53/125; F04B 53/16; F04B 417/417
  USPC ......... 310/15, 23, 24, 25, 12.01, 12.15, 266; 417/417
  See application file for complete search history.

(56) References Cited

U.S. PATENT DOCUMENTS

| | | | |
|---|---|---|---|
| 7,649,285 B2 * | 1/2010 | Ueda | F25B 9/14 310/12.01 |
| 9,531,222 B2 * | 12/2016 | Uchitani | H02K 1/148 |
| 9,677,553 B2 * | 6/2017 | Jeong | F04B 35/045 |
| 2003/0080634 A1 * | 5/2003 | Kwon | H02K 1/34 310/15 |
| 2003/0102763 A1 * | 6/2003 | Park | H02K 33/16 310/15 |
| 2003/0110615 A1 * | 6/2003 | Ku | H02K 1/278 29/596 |
| 2003/0147759 A1 * | 8/2003 | Chang | F04B 35/045 417/417 |
| 2004/0061583 A1 | 4/2004 | Yumita | |
| 2004/0145248 A1 * | 7/2004 | Jung | H02K 1/27 310/15 |
| 2005/0057101 A1 * | 3/2005 | Nakagawa | H01F 7/1615 310/12.24 |
| 2005/0104456 A1 | 5/2005 | Yajima et al. | |
| 2005/0140218 A1 | 6/2005 | Song et al. | |
| 2013/0058811 A1 * | 3/2013 | Hong | F04B 35/045 417/417 |
| 2014/0346918 A1 * | 11/2014 | Uchitani | H02K 1/148 310/208 |
| 2015/0004026 A1 * | 1/2015 | Jeong | F04B 35/045 417/415 |
| 2017/0366078 A1 * | 12/2017 | Zhang | H02K 41/02 |
| 2017/0370354 A1 * | 12/2017 | Jeong | F04B 35/04 |

FOREIGN PATENT DOCUMENTS

| | | |
|---|---|---|
| JP | 2000-083364 | 3/2000 |
| JP | 2003-250256 | 9/2003 |
| JP | 2012-23794 | 2/2012 |
| KR | 10-0492612 | 5/2005 |
| KR | 10-0539813 | 1/2006 |
| WO | WO 02/093719 | 11/2002 |
| WO | WO 2012/119302 | 9/2012 |
| WO | WO 2013/042341 | 3/2013 |

* cited by examiner

MOVEABLE CORE-TYPE RECIPROCATING MOTOR AND RECIPROCATING COMPRESSOR HAVING A MOVEABLE CORE-TYPE RECIPROCATING MOTOR

CROSS-REFERENCE TO RELATED APPLICATION(S)

Pursuant to 35 U.S.C. § 119(a), this application claims the benefit of earlier filing date and right of priority to Korean Application No. 10-2017-0003723, filed in Korea on Jan. 10, 2017, the contents of which is incorporated by reference herein in its entirety.

BACKGROUND

1. Field

A movable core-type reciprocating motor and a reciprocating compressor having a moveable core-type reciprocating motor are disclosed herein.

2. Background

A motor is a device that converts electrical energy into mechanical energy and obtains rotational or reciprocating force. Such a motor may be classified into an AC motor and a DC motor depending on a power applied.

The motor includes a stator and a mover or a rotor. The mover having a magnet is rotated or reciprocated according to a direction of a flux generated when a current flows in a coil provided in the stator.

The motor may be classified into a rotating motor or a reciprocating motor depending on a movement mode of the mover. In the rotating motor, a flux is formed in the stator by the power applied to the magnet coil and the mover rotates with respect to the stator by this flux, but in the reciprocating motor, the mover reciprocates linearly with respect to the stator.

The reciprocating motor, which usually modifies the flux of a motor having a three-dimensional structure into a plate shape, is a kind of motor that linearly moves according to a change in the magnetic field of a planar stator, where a planar mover is also placed on top of the planar stator.

Recently, a stator is formed into a cylindrical shape having an inner stator and an outer stator. A magnet coil for generating an induction magnetic field is wound on either the inner stator or the outer stator and magnets are arranged in a mover, with magnet poles arranged along an axial direction of the stator. Thus, a reciprocating motor for a compressor is being introduced that allows the mover to reciprocate in an air gap between the inner stator and the outer stator.

Such reciprocating motors for compressors are disclosed in Korean Patent No. 10-0492612 (hereinafter, referred to as "prior art 1") and Korean Patent No. 10-0539813 (hereinafter, referred to as "prior art 2"), which are hereby incorporated by reference. In the prior art 1 and the prior art 2, a plurality of iron cores formed of thin plates is radially laminated on a magnet coil formed in an annular shape to form a cylindrical outer stator or inner stator.

The reciprocating motor is provided with mechanical resonance springs made of compression coil springs on both sides of the mover in order to stably reciprocate the mover. Accordingly, when the mover moves in a forward and backward direction along a flux direction of the power source applied to the magnet coil, the mechanical resonance spring provided in a moving direction of the mover is compressed, and then, when the mover moves in an opposite direction, the mechanical resonance spring, which accumulates a repulsive force, repeats the process of pushing out the mover.

However, in the conventional reciprocating motor, the mover is supported by a mechanical resonance spring formed of a compression coil spring, but as the compression coil spring has its own resonance, there is a problem in that a certain section may not be used as an operation frequency even within an operation frequency of a certain section.

Further, in the conventional reciprocating motor, as a mechanical resonance spring made of a compression coil spring is installed, a mechanical stress limitation and a restriction, such as a vibration distance, occur due to characteristics of the compression coil spring. As a result, as the resonance spring must secure a certain diameter and length, there was a limitation in reducing a transverse length of the reciprocating motor.

Furthermore, in the conventional reciprocating motor, as a mechanical resonance spring made of a compression coil spring is installed, as a spring support member for fixing both ends of the compression coil spring must be provided in the mover and the stator, respectively. Therefore, a mechanism structure of the motor becomes complicated and a plurality of resonance springs must be installed at both sides of a front and rear of the mover, so that there is a problem that the assembling process becomes difficult.

In addition, in the conventional reciprocating motor, as the mover including the magnet between the outer stator and the inner stator is arranged to be reciprocatable, air gaps are formed on outer and inner sides of the mover, respectively, so that a total air gap is increased to lower motor efficiency. Also, in the conventional reciprocating motor, as a magnet and the magnet frame supporting the magnet have a large thickness, a weight of the entire mover increases, and this increases power consumption and also increases the air gap between the outer and inner stators. As a result, there is a problem that the motor efficiency is lowered further.

Further, as described above, in the conventional reciprocating motor, as the magnet is included in the mover, in order to prevent the magnet from being detached from the magnet frame during a reciprocating motion of the mover, it is necessary to form a coating layer by wrapping the magnet and the magnet frame with a non-magnetic material or a nonconductive material, such as a fiber and a resin. Therefore, the magnetic air gap has to be increased by the thickness of the coating layer, and the motor efficiency is further lowered by a magnitude of the increased magnetic gap.

In addition, the reciprocating compressor using the reciprocating motor as described above still has a problem in the reciprocating motor described above, and thus, has a limitation in miniaturizing the reciprocating compressor.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described with reference to the drawings. However, embodiments are not limited to the embodiments shown below, and those skilled in the art may easily realize other embodiments included in the scope by adding, modifying, deleting, adding, and the like, elements included in the scope and understand that they are also included within the scope.

In relation to the drawings attached to the following embodiments, in order to facilitate understanding within the scope that the ideas of are not undermined even in the embodiments of the same ideas of, different drawings may be expressed for each drawing in the representation of a minute portion, and a specific portion may not be displayed or may be exaggerated according to the drawings.

Figure 1:
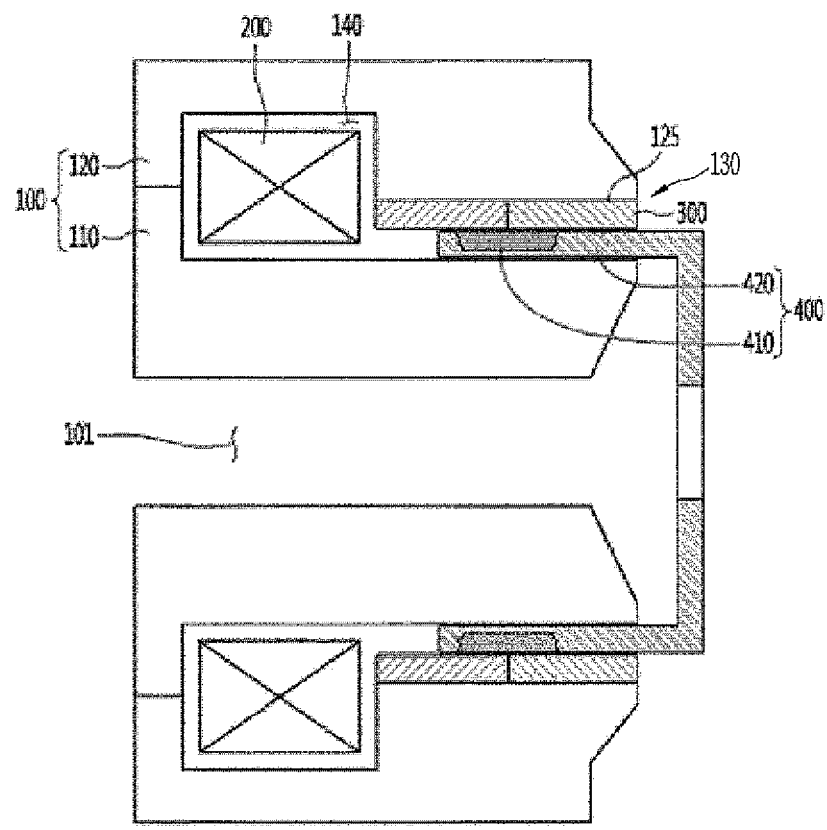
FIG. 1 is a schematic cross-sectional view of a movable core-type reciprocating motor according to an embodiment.
Figure 2:
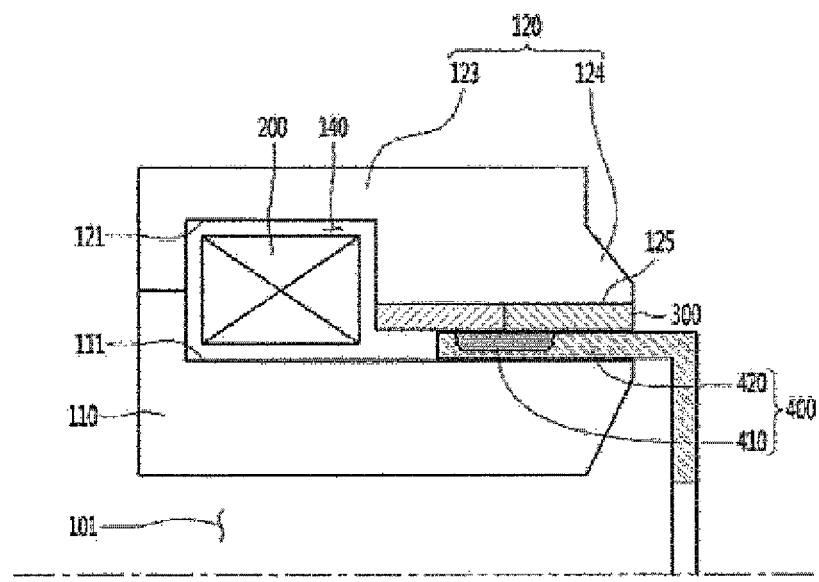
FIG. 2 is a cross-sectional view taken from a part of a stator and a mover in FIG. 1.

FIG. 1 is a cross-sectional view schematically illustrating a movable core-type reciprocating motor according to an embodiment. FIG. 2 is a cross-sectional view of a portion of a stator and a mover of FIG. 1.

Referring to FIGS. 1 and 2, a movable core-type reciprocating motor according to an embodiment may include a stator 100, a magnet coil 200, a magnet 300, and a mover 400. The stator 100 may include an inner stator 110 and an outer stator 120 having one or a first side connected to the inner stator 110 and the other or a second side spaced at an outer side in a radial direction of the inner stator 110 to form an air gap 130 with the other side of the inner stator 110.

The inner stator 110 and the outer stator 120 constituting the stator 100 may be made of a magnetic material or a conductive material, for example. In addition, the inner stator 110 according to this embodiment radially laminates a single piece of core, and the outer stator 120 radially laminates a core block with the laminated core on an outer circumferential surface of the inner stator 110. The inner stator 110 and the outer stator 120 may contact only at one or a first end in the axial direction, and may be spaced apart from the other or a second end to form one air gap.

The magnet coil 200 may be wound between the inner stator 110 and the outer stator 120, or may be accommodated in a wound state. In this embodiment, the magnet coil 200 may be connected to the inner stator 110 while being wound on the inner stator 110 and may be separately wound and then fixed between the inner stator 110 and the outer stator 120.

In the former case, after the magnet coil 200 is wound on the inner stator 110, the outer stator 120 may be fixed to the inner stator 110. On the other hand, in the latter case, the inner stator 110 may be formed by radially laminating a plurality of inner core blocks on an inner circumferential surface of the wound magnet coil 200, and the outer stator 120 may also be formed by radially laminating a plurality of outer core blocks on an outer circumferential surface of the magnet coil 200 in a wound state.

The inner stator 110 may form a hollow 101 by the radially laminated inner core block, and the hollow 101 may be used as a space later in which the piston and the cylinder are disposed.

As another example, the inner core block and the outer core block may be integrally formed in a '⊂' shape, and then inserted into the magnet coil 200 to be laminated. In addition, the outer core block may be radially laminated on the outer circumferential surface of the magnet coil 200 after radially laminating the inner core block 110a on the inner circumferential surface of the magnet coil 200. In the latter case, an operation of integrally connecting one side of the inner core block and one side of the outer core block while disposing the outer core block on the outer circumferential surface of the magnet coil 200 may be performed at the same time.

Referring to FIG. 2 again, the magnet coil 200 may be accommodated between the inner stator 110 and the outer stator 120 and a space 140 that communicates with the air gap 130 may be formed. In addition, the winding grooves 111 and 121 may be formed on at least one of the inner stator 110 or the outer stator 120 to be concave toward the inner surface, thereby forming the space 140 on the facing surface.

A size of the space 140 or the winding grooves 111 and 121 may be formed in proportion to an amount of the wound magnet coil 200. For example, as shown in FIGS. 1 to 4, the winding grooves 111 and 121 may be formed on both sides of the inner stator 110 and the outer stator 120.

Figure 5:
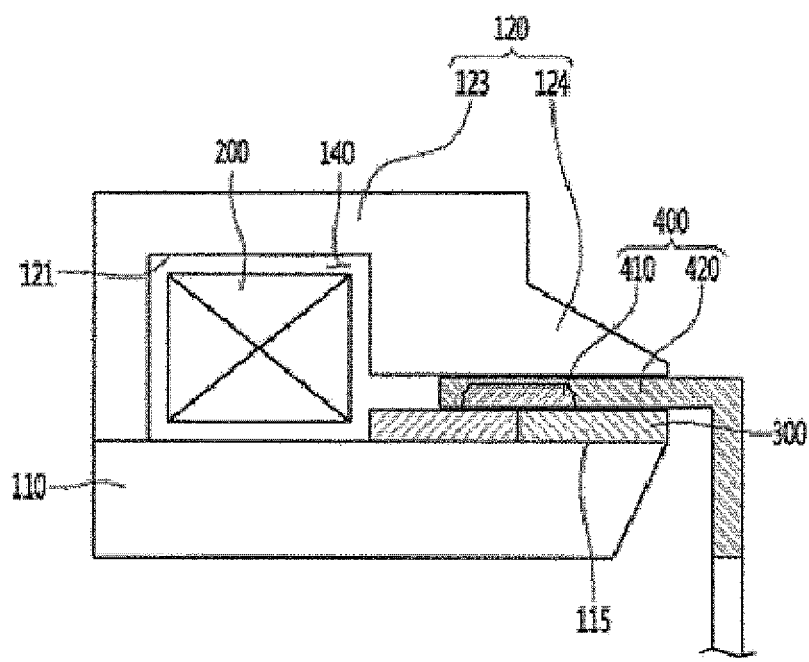
FIG. 5 is a schematic cross-sectional view of a movable core-type reciprocating motor according to another embodiment.

As another example, as shown in FIG. 5, no winding groove is formed in the inner stator 110, and the winding groove 121 may be formed only in the outer stator 120. Although not shown in the drawing, as another example, a winding groove may not be formed in the outer stator 120, and a winding groove may be formed only in the inner stator 110.

When the winding grooves 111 and 121 are formed as described above, the space 140 for accommodating the magnet coil 200 is provided, so that connection between the magnet coil 200 and the inner and outer stators 110 and 120 may be facilitated. By the winding groove 121, a yoke part or yoke 123 having a relatively thin thickness compared to a pole part or pole 124 to which the magnet 300 is fixed may be formed at the inner stator 110 and the outer stator 120.

As described above, in at least one of the inner stator 110 or the outer stator 120, the yoke part 123 forming a magnetic path and the pole part 124 extending wider than a width of the yoke part 123 and having the magnet 300 fixed may be formed. The pole part 124 may be equal to or slightly longer than a length of the fixed magnet 300.

By a combination of the yoke part 123 and the pole part 124 as described above, a stiffness of a magnetic spring, an alpha value (a thrust constant of the motor), and a change rate of the alpha value may be defined, and the yoke part 123 and the pole part 124 may have a length or form defined in a variety of ranges depending on a design of a product to which the reciprocating motor is applied.

On the other hand, as described above, the magnet 300 may be fixed to at least one of the outer circumferential surface of the inner stator 110 laminated on each of the inner circumferential surface and the outer circumferential surface of the magnet coil 200 in a cylindrical shape, or the inner circumferential surfaces of the outer stator 120. The magnet 300 may be spaced apart from the magnet coil 200 in a reciprocating direction of the mover 400, which is described hereinafter. That is, the magnet 300 and the magnet coil 200 may be arranged so as not to overlap each other in the radial direction of the stator 100.

In the conventional case, the magnet 300 and the magnet coil 200 have to overlap in the radial direction of the stator 100, and a diameter of the motor has to be increased accordingly. On the other hand, according to embodiments, as the magnet 300 and the magnet coil 200 are spaced apart from each other in the reciprocating direction of the mover 400, the diameter of the motor may be reduced compared to the related art.

In addition, the magnet 300 may be formed such that different magnet poles are arranged in the reciprocating direction of the mover 400. For example, the magnet 300 may be a 2-pole magnet having the N pole and the S pole with a same length on both sides.

In addition, in relation to the magnet 300, at least a part or portion of a cross section in the axial direction may have an arc shape. Here, the term 'axial direction' may refer the reciprocating direction of the mover 400. In this embodiment, the magnet 300 may be cylindrical.

As another example, when viewed in the axial direction, the magnet 300 may have an arc-shaped cross section, and when provided in plurality, may be spaced apart from each other along the circumferential direction of the outer circumferential surface of the inner stator 110 or the inner circumferential surface of the outer stator 120.

The magnet 300 may be exposed to the air gap 130. Magnet fixing surfaces 115 and 125 where the magnet 300 is fixed may be formed on facing surfaces of the inner stator 110 and the outer stator 120 that form the air gap 130. The magnet fixing surfaces 115 and 125 may be formed corresponding to a shape of the inner surface or the outer surface of the magnet 300. For example, in a case that the magnet 300 is fixed to the outer stator 120, when the outer surface of the magnet 300 is curved, the magnet fixing surface 125 of the outer stator 120 may also be formed as a curved surface, and when the outer surface of the magnet 300 is flat, the magnet fixing surface 125 of the outer stator 120 may also be formed as a flat surface.

As another example, in a case that the magnet 300 is fixed to the inner stator 110, when the inner surface of the magnet 300 is curved, the magnet fixing surface 115 of the inner stator 110 may also be formed as a curved surface, and when the inner surface of the magnet 300 is flat, the magnet fixing surface 115 of the inner stator 110 may also be formed as a flat surface.

For reference, when the outer or inner surface of the magnet 300 is a curved surface, the outer circumferential surface of the inner stator 110 or the inner circumferential surface of the outer stator 120 may be circular. In addition, when the outer surface or the inner surface of the magnet 300 is flat, the outer surface of the inner stator 110 or the inner surface of the outer stator 120 may have a polygonal shape.

As shown in FIGS. 1 to 4, the magnet 300 may be fixed to the outer stator 120. In addition, as shown in FIG. 5, the magnet 300 may be fixed to the inner stator 110. Although not shown in the drawing, as another example, the magnet 300 may be fixed to both the inner stator 110 and the outer stator 120.

The mover 400 may be disposed in the air gap 130 where the magnet 300 is exposed and may be made of a magnetic material and perform a reciprocation movement with respect to the stator 100 and the magnet 300. The mover 400 may be spaced apart from the magnet coil 200 in the reciprocating direction of the mover 400, so that the gap between the magnet coil 200 and the mover 400 may vary according to the reciprocation movement of the mover 400. That is, the mover 400 and the magnet coil 200 may be arranged so as not to overlap each other in the radial direction of the stator 100.

In the conventional case, the mover 400 and the magnet coil 200 have to overlap in the radial direction of the stator 100, and the diameter of the motor has to be increased accordingly. On the other hand, according to embodiments, as the mover 400 and the magnet coil 200 are spaced apart from each other in the reciprocating direction of the mover 400, the diameter of the motor may be reduced compared to the related art.

In this embodiment, in relation to the mover 400, at least a part or portion of a cross section in the axial direction may have an arc shape. That is, the mover 400 may be formed to have a hollow cylindrical shape to be inserted into the cylindrical air gap 130 formed between the cylindrical inner stator 110 and outer stator 120, or when viewed in the axial direction, may be provided in plurality and may be spaced apart from each other in the circumferential direction.

The mover 400 may include a movable core 410 disposed in the air gap 130 and made of a magnetic material and for performing a reciprocation movement with respect to the stator 100 and the magnet 300, and a hollow connection member 420 made of a non-magnetic material and for supporting the movable core 410 so as to allow the movable core 410 to be exposed to the air gap 130 toward the magnet 300.

For example, the connection member 420 may be provided in a cylindrical shape, and the movable core 410 may be fixed to an inner surface or an outer surface of the connection member 420. In addition, the connection member 420 may be formed of a non-magnetic material so as not to affect the flux flow.

As described above, when the movable core 410 is fixed to the connection member 420 to be exposed to the air gap 130, the magnetic air gap between the magnet 300 and the movable core 410 may be minimized. In this embodiment, the mover 400 is inserted with an interval between the outer surface of the inner stator 110 or the outer stator 120 exposed to the air gap 130 and the magnet 300, and for this, a size of the mover 400 should be smaller than a size of the air gap 130. That is, the inner circumferential surface of the mover 400 may be formed to have a larger diameter than the outer circumferential surface of the inner stator 110, and the outer circumferential surface of the mover 400 may be formed to have a smaller diameter than the inner circumferential surface of the outer stator 120.

The reciprocating motor according to this embodiment may perform a reciprocation movement by a reciprocating direction centering force generated between the stator 100 having the magnet coil 200, the magnet 300, and the mover 400. The reciprocating direction centering force may refer to a force that the magnetic energy (magnetic potential energy, magnetic resistance) is stored toward a low side when the mover 400 moves within the magnetic field, and this force forms a magnetic spring. Therefore, in this embodiment, when the mover 400 performs a reciprocation movement by the magnetic force of the magnet coil 200 and the magnet 300, the mover 400 accumulates a force to return in a center direction by a magnetic spring, and this force accumulated in this magnetic spring causes the mover 400 to resonate and continue to make a reciprocation movement.

Hereinafter, an operation principle of the movable core-type reciprocating motor according to this embodiment will be described.

First, an alternating flux is formed between the inner stator 110 and the outer stator 120 when an AC current is applied to the magnet coil 200 of the reciprocating motor. In this case, the mover 400 moves in both directions along a flux direction and continuously performs a reciprocation movement. Inside the reciprocating motor, a magnetic spring is formed between the mover 400 and the stator 100 and the magnet 300, thereby inducing a resonance motion of the mover 400.

Figure 3:
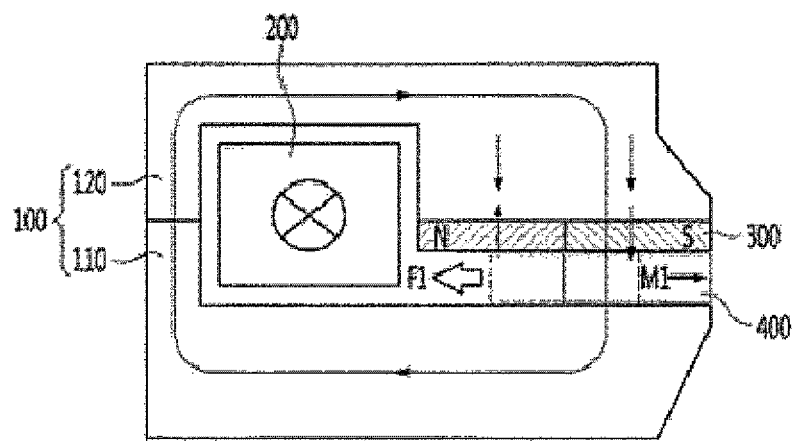
FIGS. 3 and 4 are schematic views for explaining operation of a movable core-type reciprocating motor according to an embodiment.
Figure 4:
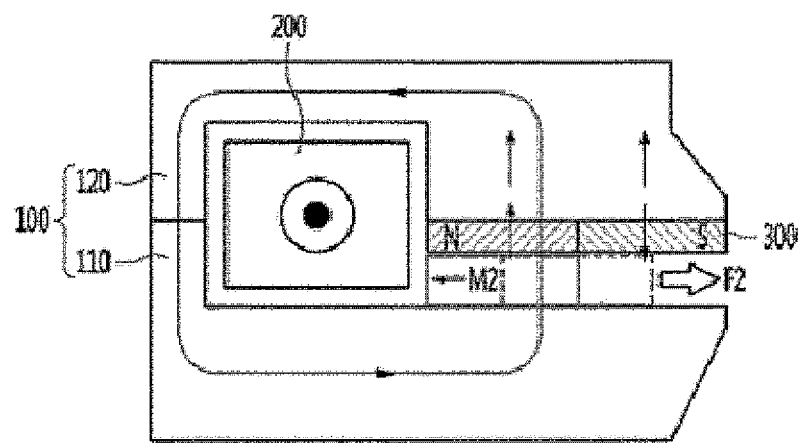

FIGS. 3 and 4 are schematic views for explaining operation of a movable core-type reciprocating motor according to an embodiment. For example, as shown in FIG. 3, in the state that the magnet 300 is fixed to the outer stator 120 and the flux by the magnet 300 flows in a clockwise direction in the drawing, when an AC current is applied to the magnet coil 200, the flux caused by the magnet coil 200 flows clockwise in the drawing, and the mover 400 moves in a rightward direction of the drawing (see arrow M1) where the flux by the magnet coil 200 and the flux by the magnet 300 are increased.

Between the mover 400 and the stator 100 and the magnet 300, a reciprocating centering force F1 to restore in a leftward direction of the drawing where magnetic energy (that is, magnetic potential energy or magnetic resistance) is low is accumulated.

In this state, as shown in FIG. 4, when the direction of the current applied to the magnet coil 200 is changed, the flux by the magnet coil 200 flows counterclockwise in the drawing, and the flux by the magnet coil 200 and the flux by the magnet 300 are increased in the opposite direction to the previous direction, that is, leftward in the drawing.

The mover 400 is moved in the left direction of the drawing (see the arrow M2) by the accumulated reciprocating centering force F1 and the magnetic force of the fluxes of the magnet coil 200 and the magnet 300. In this process, the mover 400 is further moved to the left in the drawing through a center of the magnet 300 by an inertial force and magnetic force.

In the same manner, between the mover 400 and the stator 100 and the magnet 300, a reciprocating centering force F2 to restore in the center direction of the magnet 300 where the magnetic energy is low, that is, the rightward direction of the drawing, is accumulated. Again, as shown in FIG. 3, when the direction of the current applied to the magnet coil 200 is changed, by the accumulated reciprocating centering force F2 and the magnetic force due to the fluxes of the magnet coil 200 and the magnet 300, the mover 400 moves toward the direction of the center of the magnet 300. At this time, too, the mover 400 moves further to the rightward direction in the drawing through the center of the magnet 300 due to the inertia force and the magnetic force, and the reciprocating centering force F1 to return toward the center direction of the magnet 300 where magnetic energy is low, that is, the leftward direction of the drawing, is accumulated between the mover 400 and the stator 100 and the magnet 300. In this way, the mover 400 continuously repeats a reciprocation movement that alternately moves between the right and left sides of the drawing, such as in a mechanical resonance spring.

Hereinafter, although not shown in the drawing, a resonance movement of the mover 400 will be described in the case that the magnet 300 is fixed to the inner stator 110.

In the state that the magnet 300 is fixed to the inner stator 110 and the flux by the magnet 300 flows in the counterclockwise direction, when an AC current is applied to the magnet coil 200 and the flux caused by the magnet coil 200 flows clockwise, the mover 400 moves in the leftward direction of the drawing where the flux by the magnet coil 200 and the flux by the magnet 300 are increased. The reciprocating centering force is accumulated in the rightward direction.

In this state, when the direction of the current applied to the magnet coil 200 is changed, the flux by the magnet coil 200 flows counterclockwise, and the mover 400 moves in the rightward direction of the drawing where the flux by the magnet coil 200 and the flux by the magnet 300 are increased. The mover 400 is moved in the center direction of the magnet 300 by the reciprocating centering force F1 accumulated in the rightward direction and the magnetic force by the fluxes of the magnet coil 200 and the magnet 300.

In this process, the mover 400 is further moved in the rightward direction of the drawing through the center of the magnet 300 by the inertial force and the magnetic force. In the same manner, a reciprocating centering force to return to the leftward direction may be accumulated between the mover 400 and the stator 100 and the magnet 300, and in this way, even when the magnet 300 is fixed to the inner stator 110, the mover 400 continuously repeats a reciprocation movement that alternately moves between the right and left sides of the drawing, as in a mechanical resonance spring.

Figure 6:
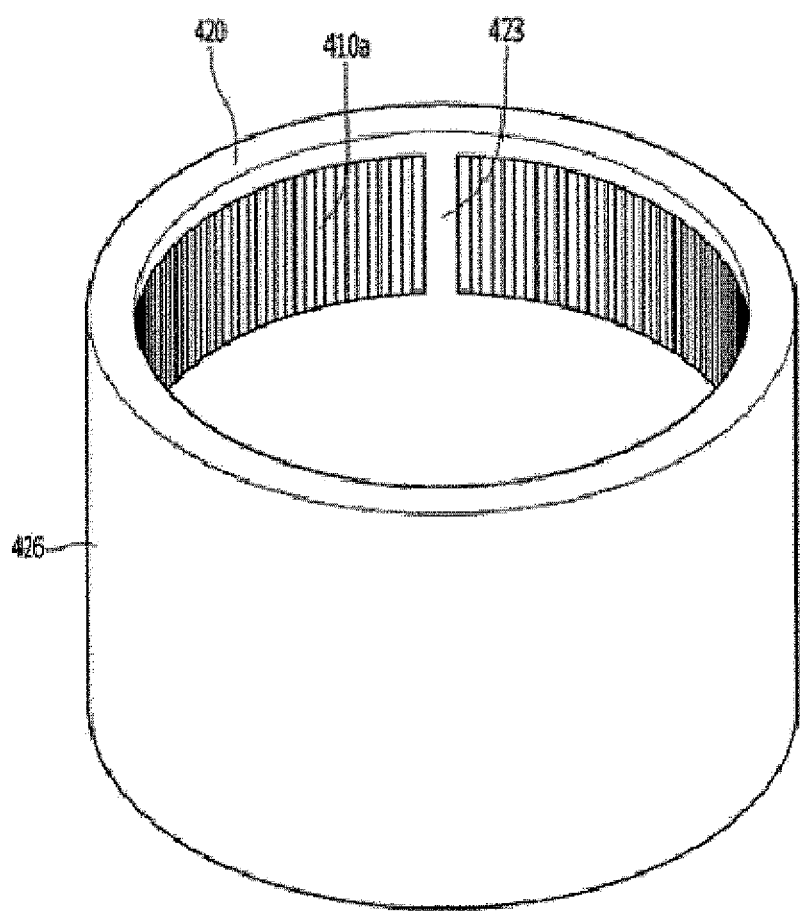
FIG. 6 is a perspective view showing an example of a mover, which is a component of embodiments.
Figure 7:
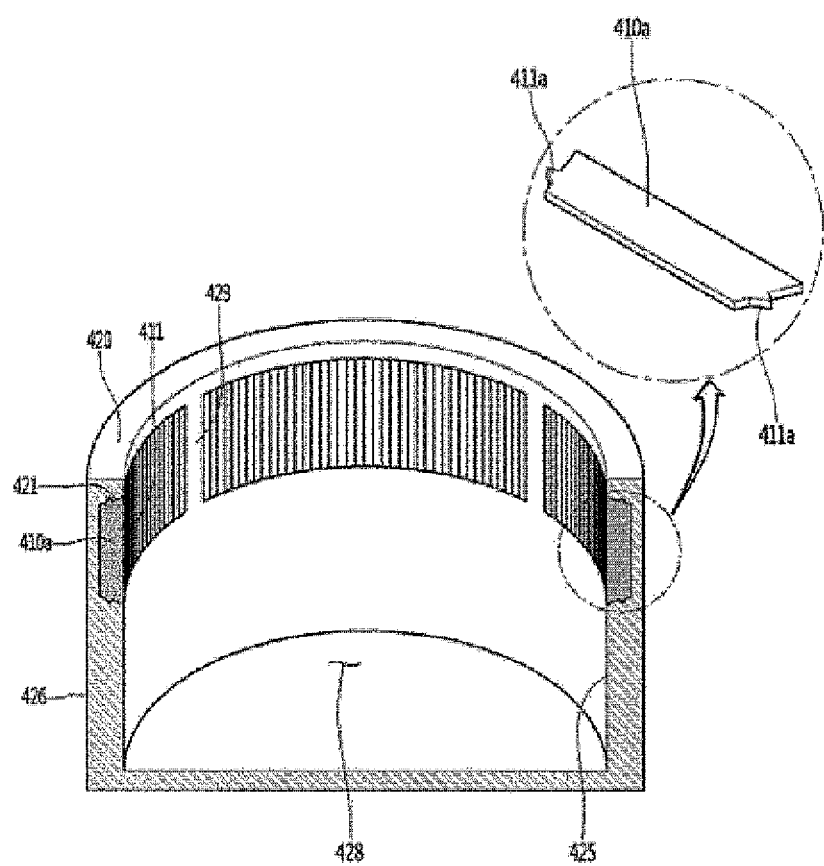
FIG. 7 is a partial perspective view showing an example of a mover, which is a component of embodiments.
Figure 8:
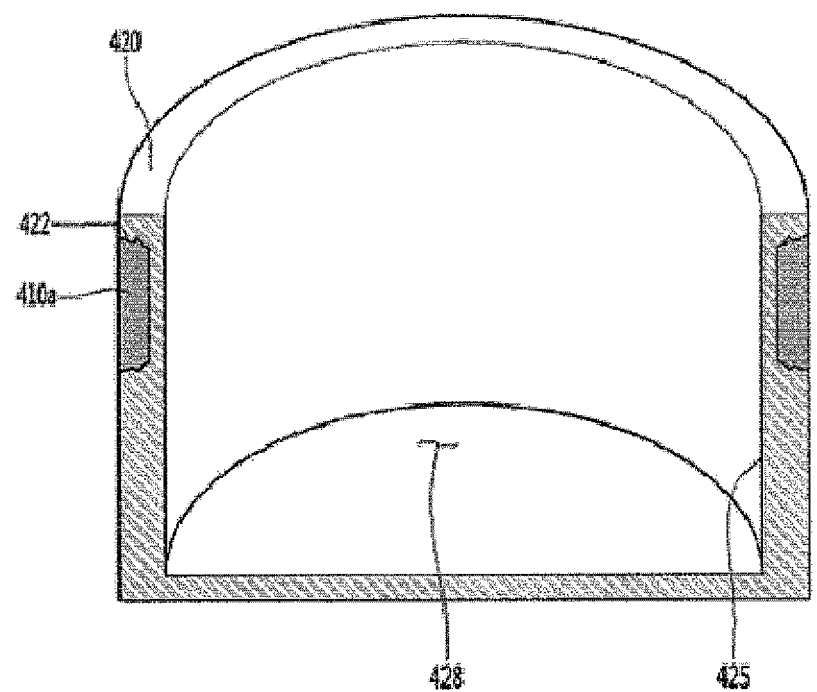
FIG. 8 is a perspective view showing another example of a mover, which is a component of embodiments.

FIG. 6 is a perspective view showing an example of a mover, which is a component of embodiments. FIG. 7 is a partially cutaway perspective view showing an example of a mover, which is a component of embodiments. FIG. 8 is a perspective view showing another example of a mover, which is a component of embodiments.

Referring to FIGS. 6 to 8, the movable core 410 may be fixed to the inner circumferential surface 425 of the connection member 420 so as to be exposed to the inner surface of the connection member 420, or to the outer circumferential surface 426 of the connection member 420 so as to be exposed to an outside of the connection member 420. The connection member 420 forms hollow 428 and has the inner circumferential surface 425 and the outer circumferential surface 426. Accordingly, the movable core 410 may be fixed to the inner circumferential surface 425 or the outer circumferential surface 426 of the connection member 420.

For example, when the magnet 300 is fixed to the inner stator 110, the movable core 410 may be fixed to the inner circumferential surface 425 of the connection member 420 so as to face the magnet 300. As another example, when the magnet 300 is fixed to the outer stator 120, the movable core 410 may be fixed to the outer circumferential surface 426 of the connection member 420 so as to face the magnet 300.

As described above, when the movable core 410 is exposed to the inner or outer side of the connection member 420, the magnetic air gap between the magnet 300 and the movable core 410 may be minimized. Generally, a magnetic spring stiffness of a motor is maximized as the air gap is smaller. Therefore, the motor spring stiffness may be increased in proportion to the reduced magnetic air gap.

In addition, unlike the prior art, embodiments do not need to cover the movable core 410 with a coating layer, such as a fiber or a resin, in order to prevent the movable core 410 from being separated, so that the structure is simple and easily manufactured. According to embodiments, even when the coating layer is removed, the fixing force of the movable core 410 is secured so that the movable core 410 may not be separated from the connection member 420.

Further, in the case of embodiments, a weight of the mover 400 may be reduced to a minimum, thereby increasing an operation frequency and enabling high-speed operation. Furthermore, according to embodiments, the magnetic spring stiffness required may be lowered compared to the prior art, and costs may be reduced.

In this embodiment, the connection member 420 may include filling grooves 421, 422 recessed inwardly on the inner circumferential surface 425 or the outer circumferential surface 426, and at least a portion of the movable core 410 may be filled and fixed to the filling grooves 421 and 422.

The movable core 410 may be attached and fixed to one side surface of the inner circumferential surface 425 or the outer circumferential surface 426 of the connection member 420, but part or all of the movable core 410 may be filled in and fixed at the filling grooves 421 and 422. However, even when the entire movable core 410 is filled in the connection member 420, the surface facing the magnet 300 may be exposed to the air gap 130.

When part or all of the movable core 410 is filled in the connection member 420 as described above, a coupling force between the movable core 410 and the connection member 420 is improved, and it is possible to prevent the movable core 410 from being detached from the connection member 420 during the reciprocation movement process of the mover 400. In addition, when part or all of the movable core 410 is filled in the connection member 420, a thickness of the mover 400 is reduced, so that a size of the air gap 130 where the mover 400 is disposed may be reduced. Accordingly, the magnetic spring stiffness of the mover 400 may be increased in proportion to the size of the reduced air gap 130.

Also, when part or all of the movable core 410 is filled in the connection member 420, at least one protrusion that protrudes toward the inner surface of the connection member 420 may be formed in the filled portion. When the protrusion is formed as described above, the coupling force between the movable core 410 and the connection member 420 is increased, so that the movable core 410 may stably maintain the filled state without being detached from the connection member 420.

In this embodiment, a plurality of the movable core 410 may be provided, and may be spaced apart from each other along the circumferential direction of the connection member 420. As an example, the movable core 410 may have an arc-shaped cross-section when viewed from the axial direction. In this case, when each movable core 410 is spaced along the circumferential direction on the inner circumferential surface 425 or the outer circumferential surface 426 of the connection member 420, the movable cores 410 are generally cylindrical.

As described above, when a plurality of movable cores 410 is provided and are spaced apart along the circumferential direction of the connection member 420, a joint part or joint 423 may be formed between the movable core 410 in the axial direction, so that a structural strength of the connection member 420 may be improved, and the movable core 410 may also be seated and supported on the connection member 420 more stably by the joint part 423. In addition, the movable core 410 may be more easily inserted into the filling grooves 421 and 422 formed in the inner circumferential surface 425 or the outer circumferential surface 426 of the connection member 420, thereby improving the workability.

As another example, the movable core 410 may be provided as a single body, and in this case, the movable core 410 may have a cylindrical form with a hollow. When the movable core 410 is spaced along the circumferential direction of the connection member 420 and the magnet 300 is also spaced apart from the stator 100 along the circumferential direction, a number of the magnets 300 and a number of the movable cores 410 may be the same.

In addition, the number of the magnets 300 may be N times (N is a natural number) the number of the movable cores 410, and the number of the movable cores 410 may be N times (N is a natural number) the number of the magnets 300. For example, when the number of the magnets 300 is 12, the number of the movable cores 410 may be 6. When the number of the magnets 300 and the number of the movable cores 410 are set as described above, as eccentricity does not occur in mover 400, the mover 400 may perform a reciprocation movement while maintaining a straight line without rotating in any direction.

Figure 9:
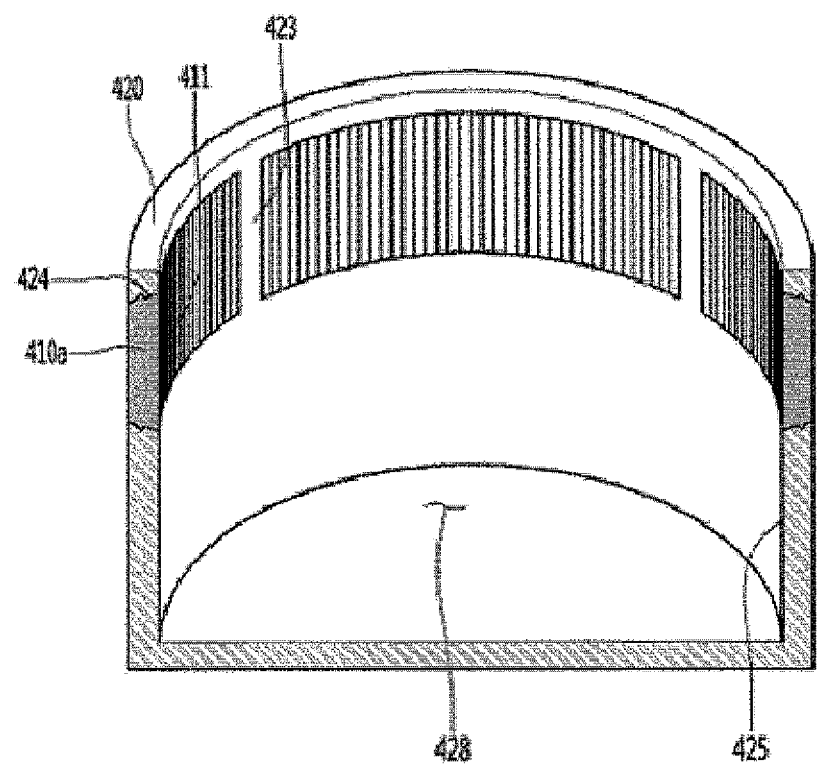
FIG. 9 is a perspective view showing another example of a mover, which is a component of embodiments.

FIG. 9 is a perspective view showing another example of a mover, which is a component of embodiments. Referring to FIG. 9, the movable core 410 may be fixed through the connection member 420 so as to be exposed to inner and outer sides of the connection member 420.

In such a case, a hole 424 through which the movable core 410 may pass may be formed in the connection member 420. As described above, when the movable core 410 is exposed to the inner or outer side of the connection member 420, both sides of the movable core 410 may be exposed to the air gap 130 in the radial direction. Therefore, the magnetic air gap of the mover 400, the magnet 300, and the stator 100 may be further reduced by the thickness of the omitted connection member 420, and the magnetic spring stiffness of the mover 400 may be increased in proportion to the size of the reduced air gap 130.

In this embodiment, in relation to the movable core 410, the exposed surface 411 exposed to the inner or outer side of the connection member 420 may be positioned on a straight line with the inner circumferential surface 425 or the outer circumferential surface 426 of the connection member 420. That is, when the movable core 410 is filled in the inner circumferential surface 425 or the outer circumferential surface 426 of the connection member 420, the exposed surface 411 of the movable core 410 may not protrude or be recessed from than the inner circumferential surface 425 or the outer circumferential surface 426 of the connection member 420, and may be formed on a straight line with the inner circumferential surface 425 or the outer circumferential surface 426.

As described above, when the exposed surface 411 of the movable core 410 is positioned on a straight line with the inner circumferential surface 425 or the outer circumferential surface 426 of the connection member 420, the movable core 410 may be more stably fixed to the connection member 420. In addition, it is possible to prevent the movable core 410 from colliding with the stator 100 or the magnet 300 during the reciprocation movement process of the mover 400.

On the other hand, when the movable core 410 penetrates the connection member 420, a radial thickness of the connection member 420 is formed to be equal to a radial thickness of the movable core 410, so that the inner and outer exposed surfaces 411 of the movable core 410 may not protrude or be recessed from the inner circumferential surface 425 and the outer circumferential surface 426 of the connection member 420 and may be formed on a straight line with the inner circumferential surface 425 and the outer circumferential surface 426.

In this embodiment, the movable core 410 and the connection member 420 may be integrally formed through insert injection, for example. That is, after the movable core 410 is manufactured first, when the connection member 420 is molded through injection, the movable core 410 is inserted into the mold and integrally molded with the connection member 420. In this case, the operation of fixing the movable core 410 to the connection member 420 may be omitted, and workability may be enhanced. In addition, a coupling force between the movable core 410 and the connection member 420 is improved, so that the movable core 410 may be prevented from being detached from the connection member 420.

In the above example, although it has been stated that the movable core 410 and the connection member 420 are integrally formed through insert injection, embodiments are not limited thereto, and the movable core 410 and the connection member 420 may be integrally formed by various concurring methods. In addition, the movable core 410 and the connection member 420 may be separately manufactured, and may be formed as a single body through a separate assembly or attachment process.

In this embodiment, a material of the connection member 420 may include glass fiber. For example, the connection member 420 may be made of glass fiber only. As another example, the connection member 420 may be made of a mixture of glass fiber and plastic.

As glass fiber is a non-magnetic and non-conductive material, when the connection member 420 is made of a material including glass fiber, a stiffness of the connection member 420 may be ensured and eddy loss in the mover 400 may be reduced. In addition, injection molding of the connection member 420 is possible. The glass fiber may be integrally fixed to the movable core 410 through heating and curing processes.

Referring again to FIGS. 6 to 9, the movable core 410 may be formed by radially laminating a first segment 410*a* disposed in parallel with the reciprocating direction of the movable core 410 along the circumferential direction of the connection member 420. As an example, the first segment 410*a* may have the form of a thin square pin.

The first segment 410*a* may be radially laminated on the inner circumferential surface 425 or the outer circumferential surface 426 of the connection member 420. In addition, the first segment 410*a* may be radially laminated on the entire inner circumferential surface 425 or outer circumferential surface 426 of the connection member 420 or may be formed on only a partial section.

In the latter case, a first segment unit where a plurality of first segments 410*a* are sequentially laminated may be spaced apart at regular intervals along the circumferential direction of the connection member 420. Also, in this embodiment, the first segment 410*a* may be disposed corresponding to the inner core block and the outer core block. As described above, when the movable core 410 is configured by radially laminating the plurality of first segments 410*a*, the eddy current may be reduced.

Figure 10:
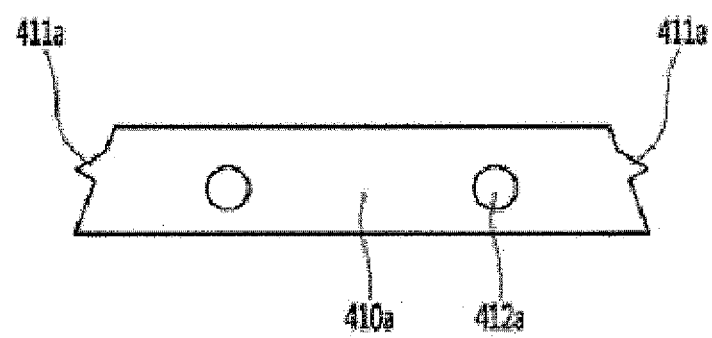
FIG. 10 is a perspective view showing an example of a first segment, which is a component of embodiments.
Figure 11:
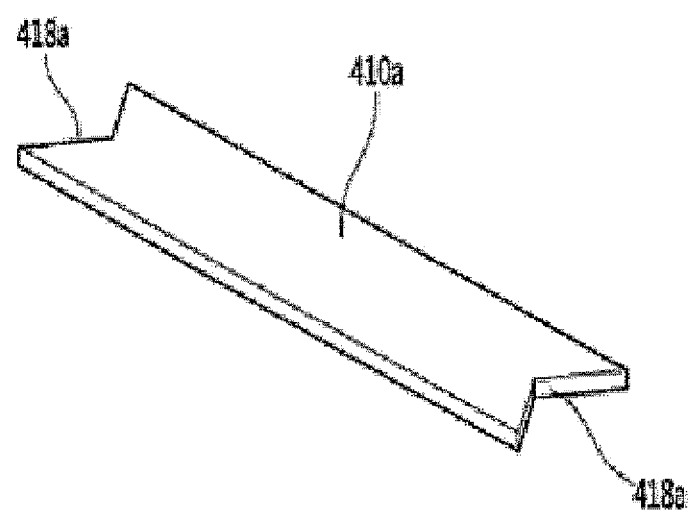
FIG. 11 is a perspective view showing another example of a first segment, which is a component of embodiments.

FIG. 10 is a perspective view showing an example of a first segment, which is a component of embodiments. FIG. 11 is a perspective view showing another example of a first segment, which is a component of embodiments.

Referring to FIGS. 10 and 11, the first segment 410*a* may include a fixing protrusion 411*a* that protrudes toward the inner side of the connection member 420 on at least one side surface contacting the connection member 420. For example, the fixing protrusion 411*a* may be formed parallel to the reciprocating direction of the mover 400 on both sides of the first segment 410*a*.

A concave fixing groove into which the fixing protrusion 411*a* may be inserted may be formed in the first segment 410*a*. As another example, the concave fixing grooves 418*a* may be formed on both sides of the first segment 410*a*, and a fixing protrusion inserted into the fixing groove 418*a* of the first segment 410*a* may be formed on the connection member 420.

When the fixing protrusion 411*a* or the fixing groove 418*a* is formed in the first segment 410*a* as described above, a coupling force between the first segment 410*a* and the connection member 420 increases, so that the first segment 410a may stably maintain a fixed state without being separated from the connection member 420.

Referring again to FIG. 10, at least one hole 412a may be perforated in the first segment 410a. A protrusion may be formed on the connection member 420 to be inserted into the hole 412a along the circumferential direction. When the hole 412a is formed as described above, a weight of the first segment 410a may be reduced, so that a weight of the mover 400 may be reduced overall.

Also, as the protrusion formed in the circumferential direction in the connection member 420 is inserted into the hole 412a, alignment of the first segment 410a may be made automatically, and furthermore, the coupling force between the first segment 410a and the connection member 420 may be improved. Further, when the first segment 410a and the connection member 420 are injection molded, a part or portion of the plastic constituting the connection member 420 may penetrate through the hole 412a, so that the coupling force between the first segment 410a and the connection member 420 may be further improved.

Figure 12:
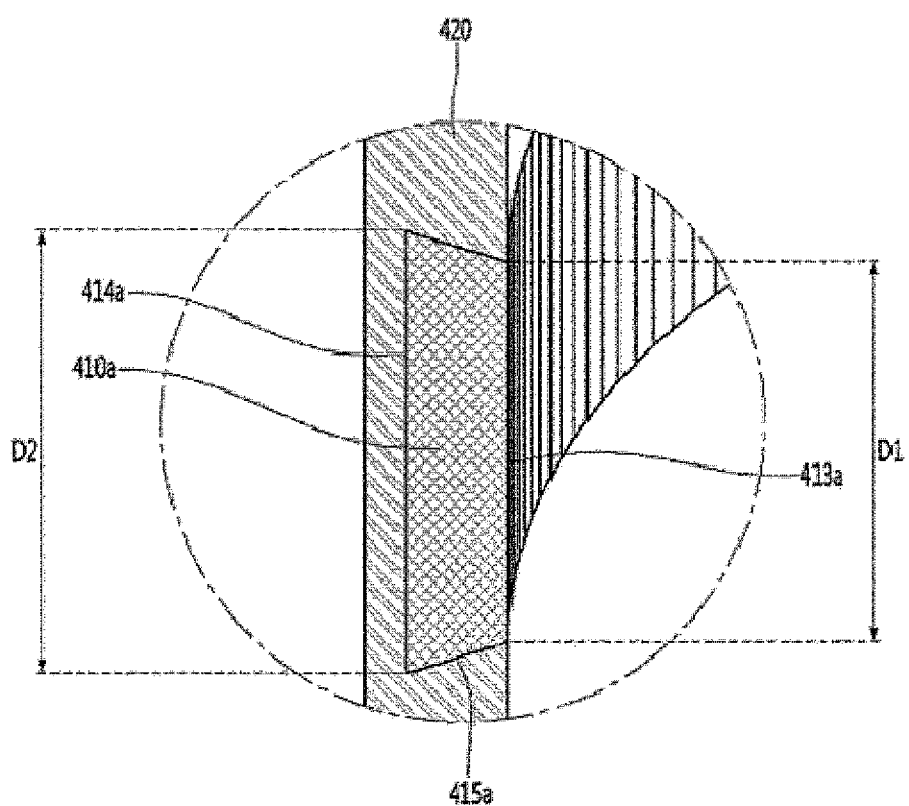
FIGS. 12 and 13 are perspective views showing another example of a mover, which is a component of embodiments.
Figure 13:
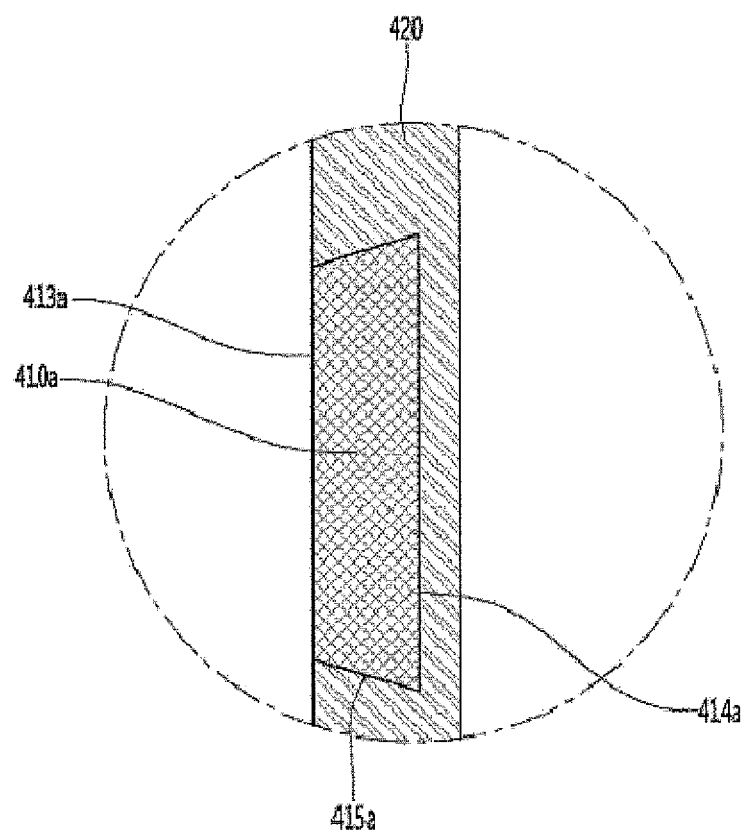

FIGS. 12 and 13 are perspective views showing another example of a mover, which is a component of embodiments. Referring to FIGS. 12 and 13, in relation to the first segment 410a, a length D1 of exposed surface 413a exposed to the inner or outer side of the connection member 420 may be shorter than a length D2 of contact surface 414a contacting the connection member 420. When the lengths D1 and D2 of the exposed surface 413a and the contact surface 414a of the first segment 410a are different from each other, an inclined surface 415a is formed on both sides of the first segment 410a.

As discussed above, when the length D1 of the exposed surface 413a exposed to the inner or outer side of the connection member 420 is shorter than the length D2 of the contact surface 414a contacting the connection member 420, even when no fixing protrusion or fixing groove is formed in the first segment 410a, the coupling force between the first segment 410a and the connection member 420 increases, so that the first segment 410a may not be separated from the connection member 420 and may stably maintain the fixed state.

Figure 14:
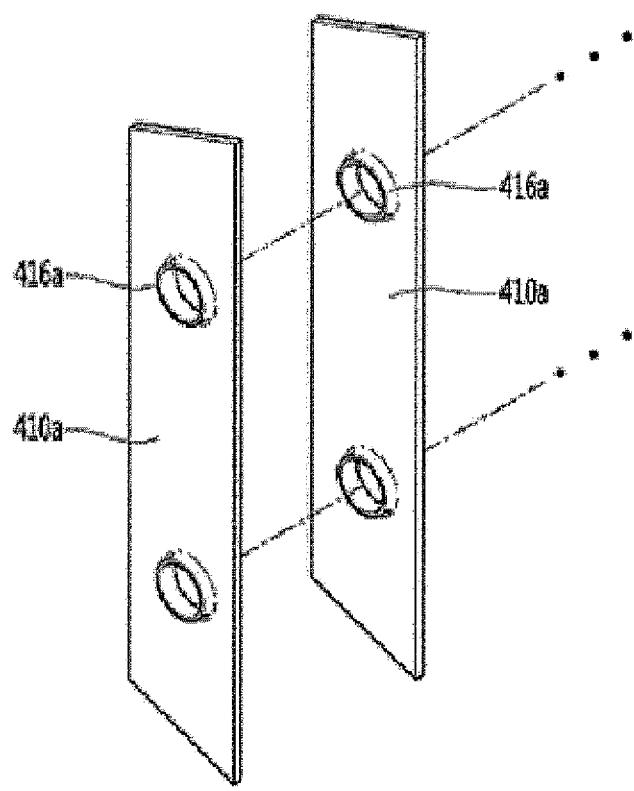
FIG. 14 is a perspective view showing another example of a first segment, which is a component of embodiments.
Figure 15:
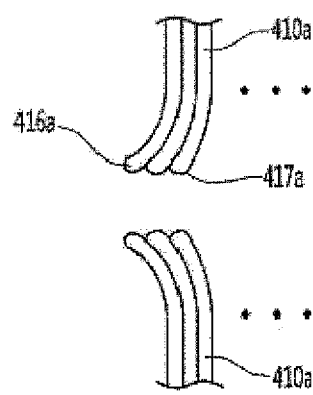
FIG. 15 is a cross-sectional view showing a laminated state of a first segment, which is a component of embodiments.

FIG. 14 is a perspective view showing another example of a first segment, which is a component of embodiments. FIG. 15 is a cross-sectional view showing a state in which a first segment is laminated, which is a component of embodiments.

Referring to FIGS. 14 and 15, the first segment 410a may form a protrusion part or protrusion 416a that protrudes in parallel with a lamination direction and a recessed groove part or groove 417a. For example, the protrusion part 416a and the groove part 417a may be formed by laminating and punching the first segments 410a. In addition, the first segment 410a may have various shapes of recesses and protrusions ( [凹凸] ).

As described above, when the protrusion part 416a and the groove part 417a are formed in the first segment 410a, a plurality of first segments 410a is laminated while the protrusion part 416a is inserted into the groove part 417a so that the lamination operation may be easily performed. Further, even after laminating of the first segments 410a is completed, when a state in which the protrusion part 416a is inserted into the groove part 417a is maintained, the coupling force between the plurality of first segments 410a is secured, so that the laminated shape may not be disturbed and the laminated state may be firmly maintained.

Figure 16:
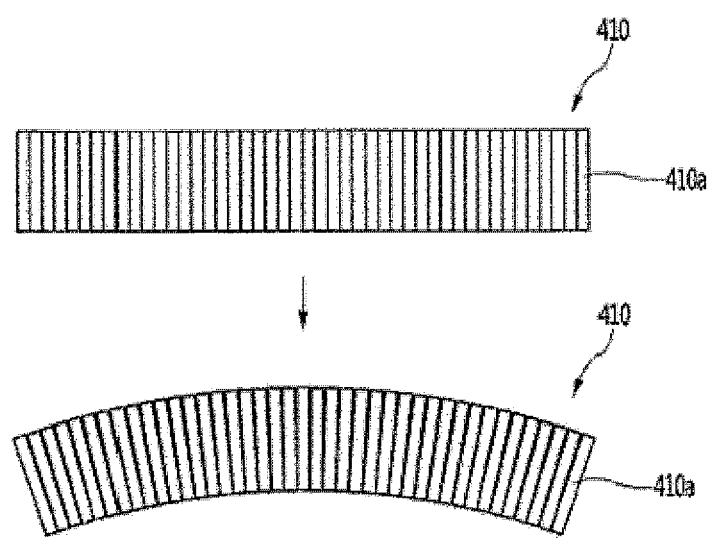
FIG. 16 is a conceptual diagram illustrating a process in which a first segment, which is a component of embodiments, is radially laminated.

FIG. 16 is a conceptual diagram illustrating a process in which a first segment, which is a component of embodiments, is radially laminated. Referring to FIG. 16, in relation to the first segments 410a, a radial lamination may be accomplished through a method of performing processing after being laminated on or in a straight line. Therefore, the operation of radiating the first segment 410a may be performed more easily.

When the protrusion part 416a and the groove part 417a described above are formed in the first segment 410a, it is easy to perform lamination on a straight line, and as the coupling force between the plurality of first segments 410a is secured, the operation of processing the first segment 410a laminated on a straight line to have a certain curvature may easily proceed.

Figure 17:
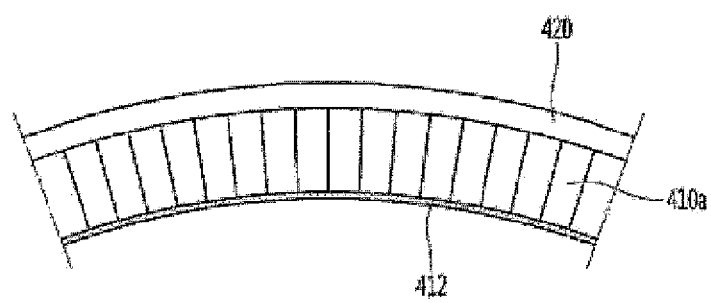
FIGS. 17 and 18 are cross-sectional views showing another example of a mover, which is a component of embodiments.
Figure 18:
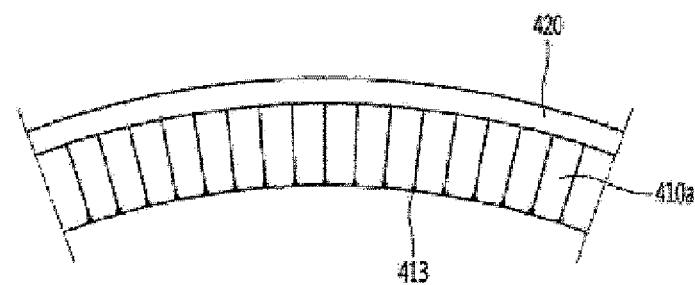

FIGS. 17 and 18 are cross-sectional views showing another example of a mover, which is a component of embodiments. Referring to FIG. 17, in relation to the movable core 410, an adhesive may be applied to the exposed surface exposed to the inner or outer side of the connection member 420 to connect the plurality of laminated first segments 410a.

When the first segments 410a are connected to each other through the adhesive, the coupling force between the first segments 410a may be secured. On the other hand, after the one-segment 410a is laminated on or in a straight line, even in the case that radial lamination of the first segment 410a is performed through a method of performing processing to have a curvature, after an adhesive is applied to the inner surface of the plurality of laminated first segments 410a to form an adhesive layer 412, when performing processing to have a curvature, as the curvature forming operation proceeds in a state in which the coupling force between the first segments 410a is secured, as a result, the operation of radially laminating the first segment 410a may be performed more easily.

In addition, referring to FIG. 18, in relation to the movable core 410, the plurality of laminated first segments 410a may be connected by welding the exposed surfaces exposed to the inner or outer of the connection member 420. When the first segments 410a are connected to each other through the welding, the coupling force between the first segments 410a may be secured.

On the other hand, after the one-segment 410a is laminated on a straight line, even in the case that radial lamination of the first segment 410a is performed through a method of performing processing to have a curvature, after the plurality of laminated first segments 410a are welded to form a welding part or welding 413, when performing processing to have a curvature, as the curvature forming operation proceeds in a state in which the coupling force between the first segments 410a is secured, as a result, the operation of radially laminating the first segment 410a may be performed more easily.

Figure 19:
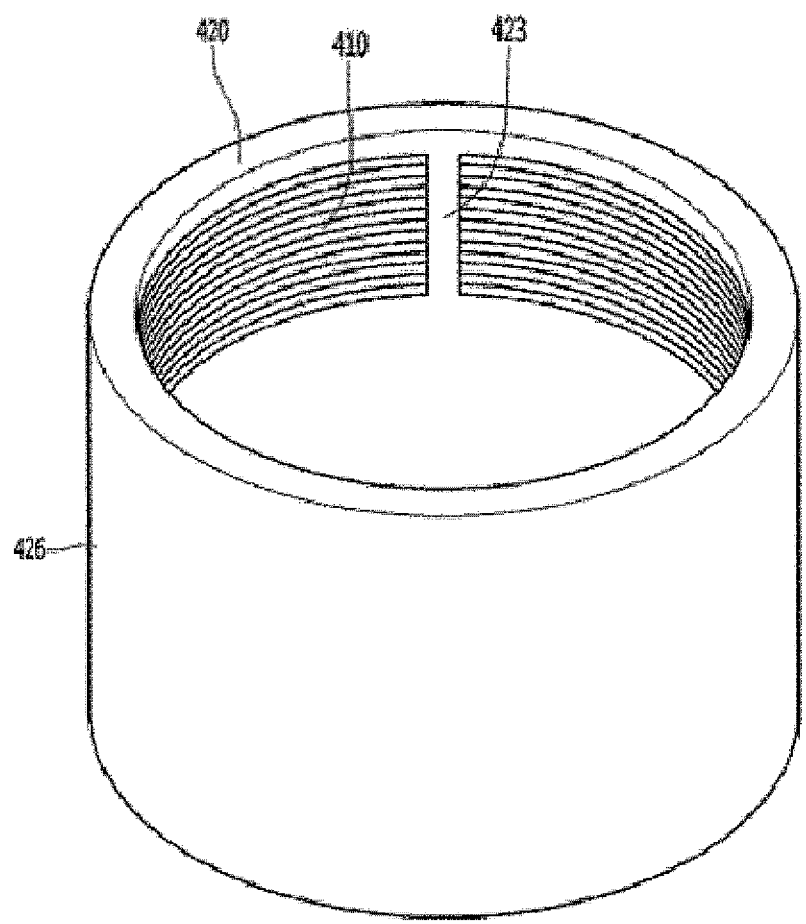
FIG. 19 is a perspective view showing another example of a mover, which is a component of embodiments.
Figure 20:
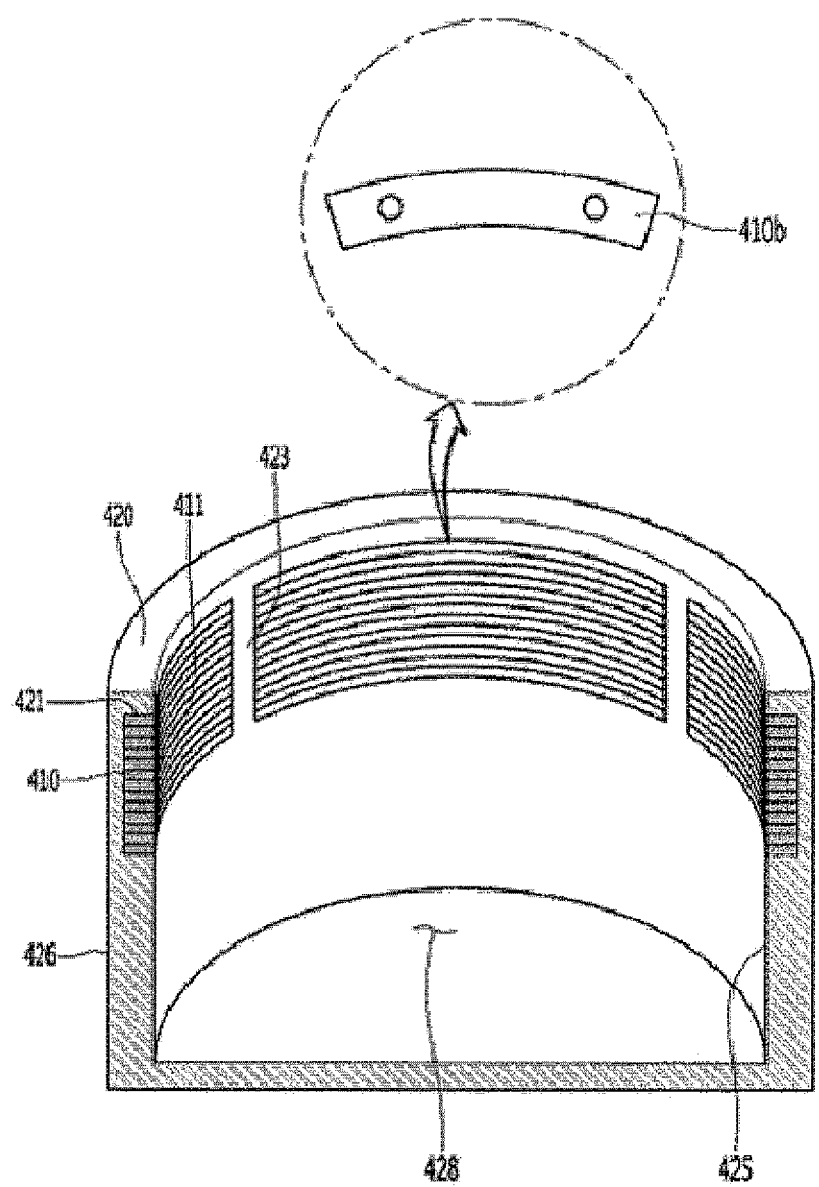
FIG. 20 is a partial perspective view showing another example of a mover, which is a component of embodiments.
Figure 21:
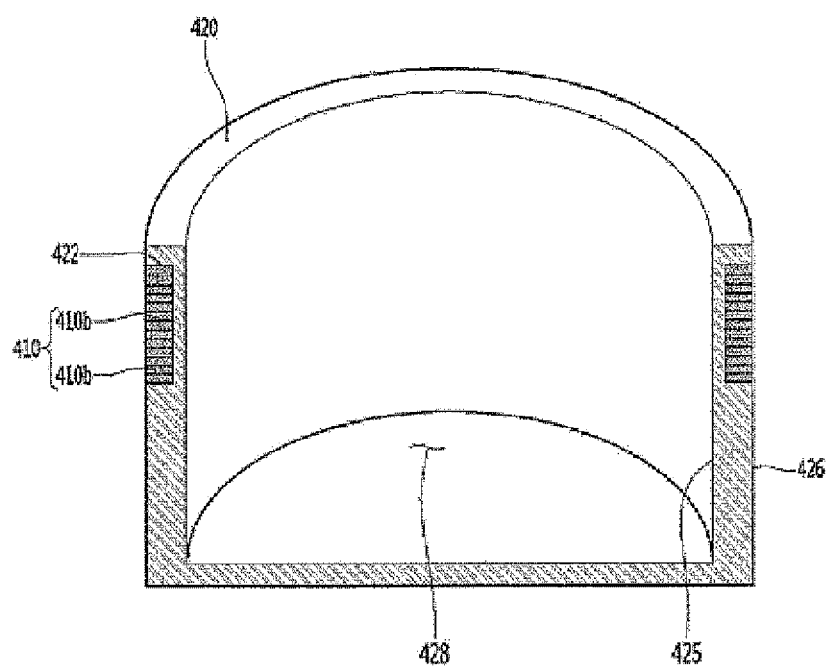
FIG. 21 is a perspective view showing another example of a mover, which is a component of embodiments.
Figure 22:
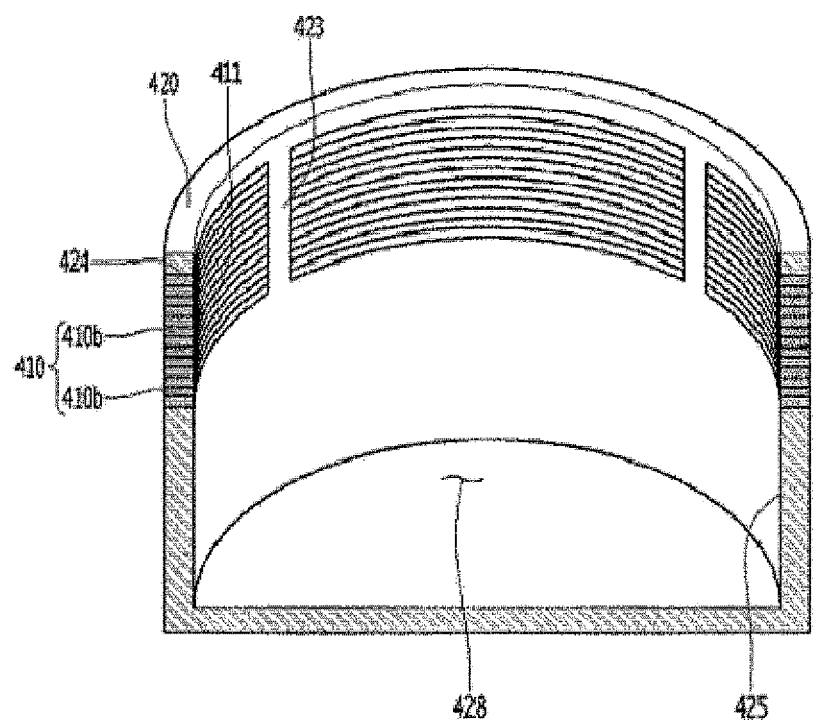
FIG. 22 is a perspective view showing another example of a mover, which is a component of embodiments.

FIG. 19 is a perspective view showing another example of a mover, which is a component of embodiments. FIG. 20 is a partially cutaway perspective view showing another example of a mover, which is a component of embodiments. FIGS. 21 and 22 are perspective views showing another example of a mover, which is a component of embodiments.

Referring again to FIGS. 19 to 22, the movable core 410 may be formed by laminating a second segment 410b disposed in parallel with the circumferential direction of the connection member 420 in the reciprocating direction of the movable core 410. For example, the second segment 410b may be at least partially arc shaped and may have a thinner thickness.

The second segment 410b may be laminated on the inner circumferential surface or the outer circumferential surface of the connection member 420 in the reciprocating direction of the mover 400. In addition, the second segment 410b may be formed on the entire inner circumferential surface or outer circumferential surface of the connection member 420, or may be formed on only a partial section.

In the latter case, second segment units in which the plurality of second segments 410b is continuously laminated may be spaced apart at regular intervals along the circumferential direction of the connection member 420. As another example, the second segment 410b may be circular.

As described above, when the movable core 410 is configured by laminating the plurality of first segments 410a, the eddy current may be reduced.

Figure 23:
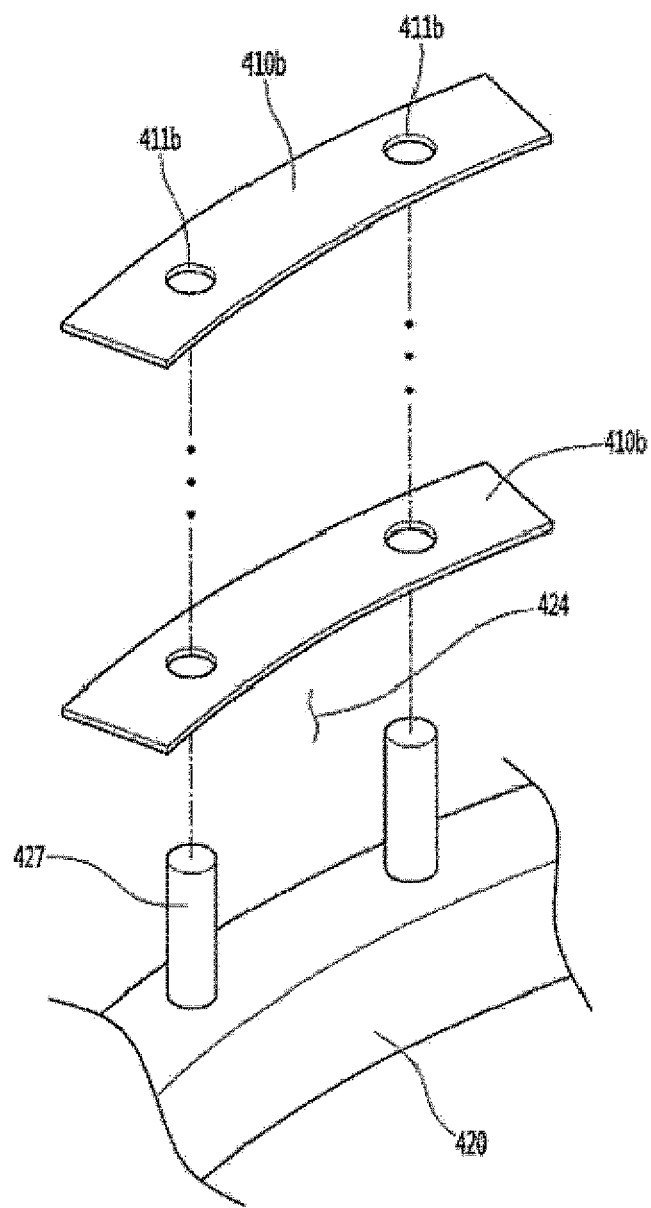
FIG. 23 is an exploded perspective view of a second segment and a connection member, which are components of embodiments.

FIG. 23 is an exploded perspective view of a second segment and a connection member, which are components of embodiments. Referring to FIG. 23, at least one lamination hole 411b may be perforated in the second segment 410b, and a lamination protrusion 427 may be formed on the connection member 420 in parallel with the lamination direction of the second segment 410b. While the lamination protrusion 427 is inserted in the lamination hole 411b, lamination of the second segments 410b may be achieved.

When the lamination hole 411b is perforated on the second segment 410b as described above, a weight of the second segment 410b becomes lighter, so that the weight of the mover 400 may be reduced as a whole. In addition, the second segment 410b may be more easily laminated, and the coupling force between the second segment 410b and the connection member 420 may be improved.

Further, even when the second segment 410b and the connection member 420 are injection molded, a part or portion of the plastic constituting the connection member 420 may penetrate through the lamination hole 411b, so that the coupling force between the second segment 410b and the connection member 420 may be further improved.

Figure 24:
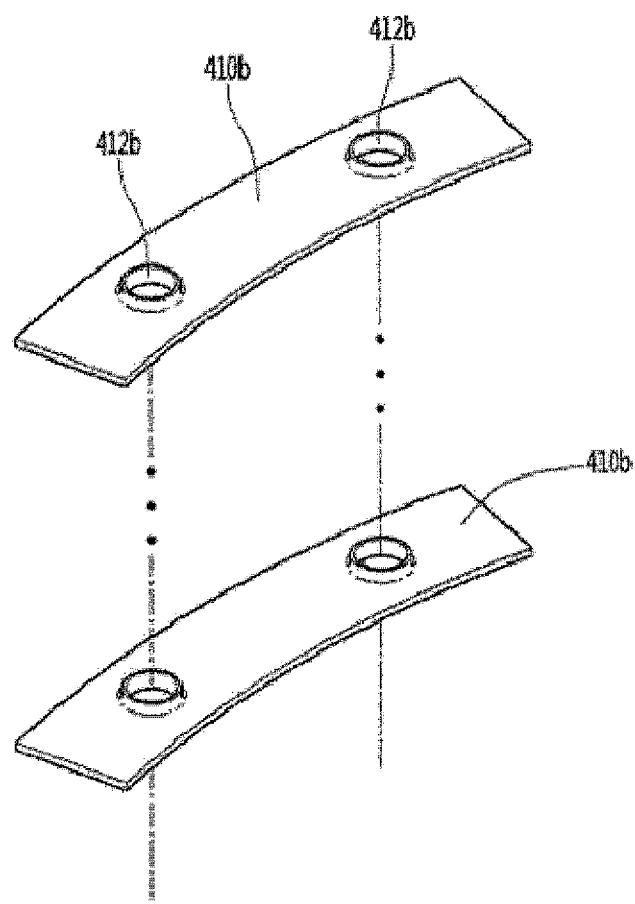
FIG. 24 is a perspective view showing another example of a second segment, which is a component of embodiments.
Figure 25:
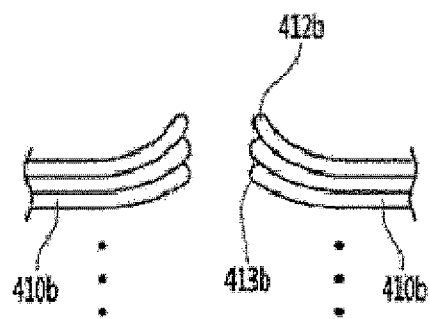
FIG. 25 is a cross-sectional view showing a laminated state of a second segment, which is a component of embodiments.

FIG. 24 is a perspective view showing another example of a second segment, which is a component of embodiments. FIG. 25 is a cross-sectional view showing a state in which a second segment is laminated, which is a component of embodiments.

Referring to FIGS. 24 to 25, the second segment 410b may form a protrusion part 412b that protrudes in parallel with the lamination direction and a recessed groove part 413b. For example, the protrusion part 412b and the groove part 413b may be formed by laminating and punching the second segments 410b. In addition, the second segment 410b may have various shapes of recesses and protrusions (凹凸).

As described above, when the protrusion part 412b and the groove part 413b are formed in the second segment 410b, a plurality of second segments 410b is laminated while the protrusion part 412b is inserted into the groove part 413b so that the lamination operation may be easily performed. Further, even after laminating of the second segments 410b is completed, when a state in which the protrusion part 412b is inserted into the groove part 413b is maintained, the coupling force between the plurality of first segments 410a is secured, so that the laminated shape may not be disturbed and the laminated state may be firmly maintained.

Figure 26:
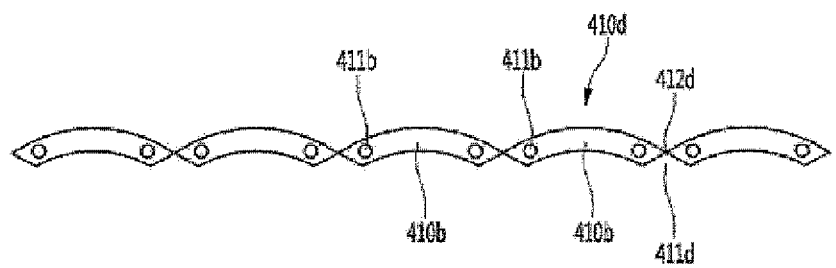
FIG. 26 is a view showing an example of a second segment band constituting a movable core, which is a component of embodiments.
Figure 27:
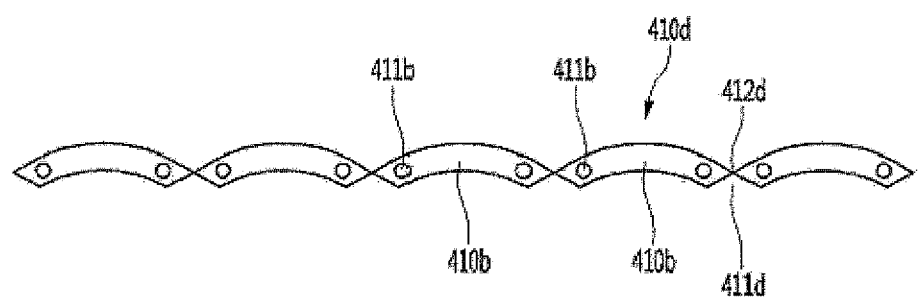
FIG. 27 is a view showing another example of a second segment band constituting a movable core, which is a component of embodiments.
Figure 28:
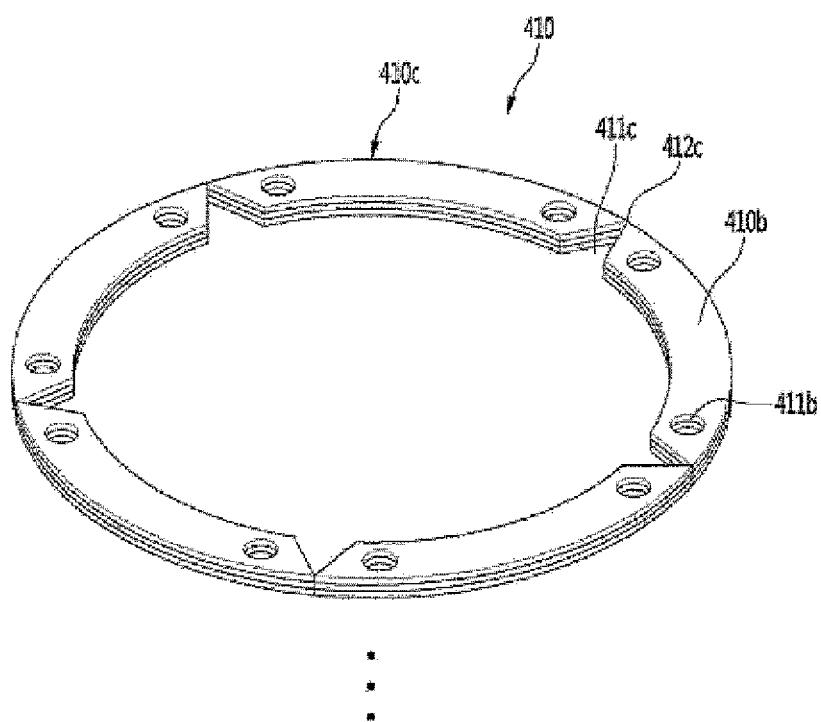
FIG. 28 is a view showing an example of a second segment ring constituting a movable core, which is a component of embodiments.

FIG. 26 is a view showing an example of a second segment band constituting a movable core, which is a component of embodiments. FIG. 27 is a view showing another example of a second segment band constituting a movable core, which is a component of embodiments. FIG. 28 is a view showing an example of a second segment ring constituting a movable core, which is a component of embodiments.

Referring to FIGS. 26 and 27, the movable core 410 may be formed by laminating the second segment ring 410c connected in series to allow the second segment 410b having an arc shape to be circular in the reciprocating direction of the mover 400. In relation to the second segment 410b constituting the second segment ring 410c, a length of the inner circumferential surface may be formed to be less than a length of the outer circumferential surface. Accordingly, a connection part or portion 412c where both outer circumferential end parts or portions contact with each other is formed, and a cutout part or cutout 411c may be formed between the respective second segments 410b.

As described above, when the movable core 410 is configured by laminating the circular second segment rings 410c, a gap between the second segments 410b is secured by the cutout part 411c, and the workability of forming the movable core by laminating the second segment rings 410c may be improved. Further, the coupling force between the second segments 410b may be secured, so that a structural strength of the movable core 410 may be improved.

In this embodiment, the second segment ring 410c may be provided by cutting the second segment band 410d where the second segment 410b is connected continuously, and then connecting both end parts or ends to form a closed curve. As described above, when the second segment ring 410c is manufactured with the second segment band 410d, the second segment band 410d, which is a length material, may be manufactured easily through punching, for example, so that workability may be improved and material costs may be reduced.

Figure 29:
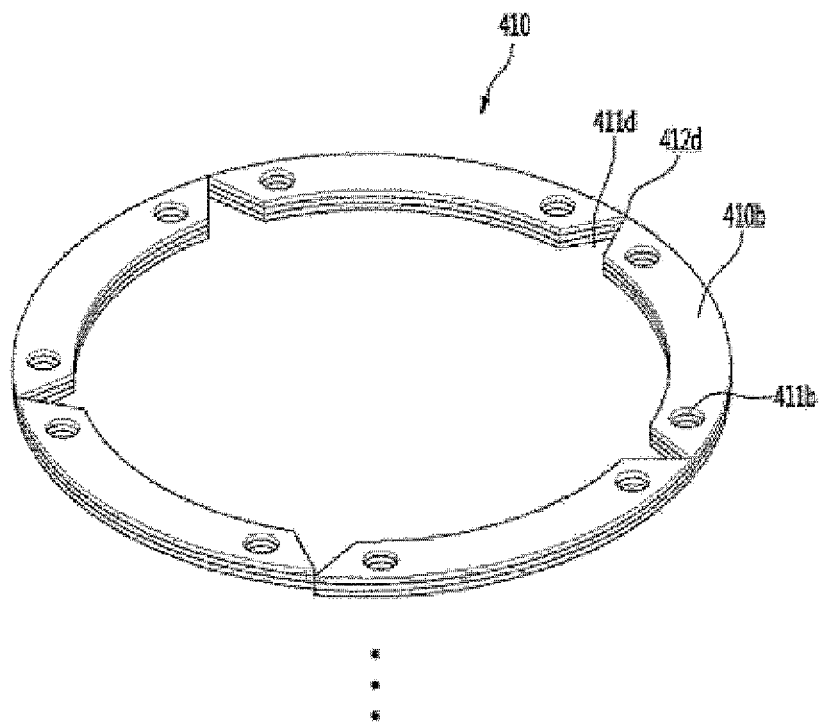
FIG. 29 is a perspective view showing a state in which a movable core, which is a component of embodiments, is formed by winding a second segment band.

FIG. 29 is a perspective view showing a state in which a movable core, which is a component of embodiments, is formed by winding a second segment band. Referring to FIG. 29, the movable core 410 may be formed by winding the second segment band 410d, where the second segments 410b having an arc shape are connected in series, on the connection member 420.

In relation to the second segment 410b constituting the second segment band 410d, the length of the inner circumferential surface is formed to be less than the length of the outer circumferential surface. Accordingly, a connection part 412d where both outer circumferential end parts or ends contact with each other is formed, and a cutout part or cutout 411d may be formed between the respective second segments 410b.

As described above, when the movable core 410 is configured by winding the second segment 410d on the connection member 420, the second segment 410d, which is a length material, may be manufactured easily by punching, for example, and the second segment 410b may be laminated by or to a desired thickness by merely winding the connection member 420, so that workability may be improved. Further, the coupling force between the second segments 410b may be also secured, so that the structural strength of the movable core 410 may be improved.

Figure 30:
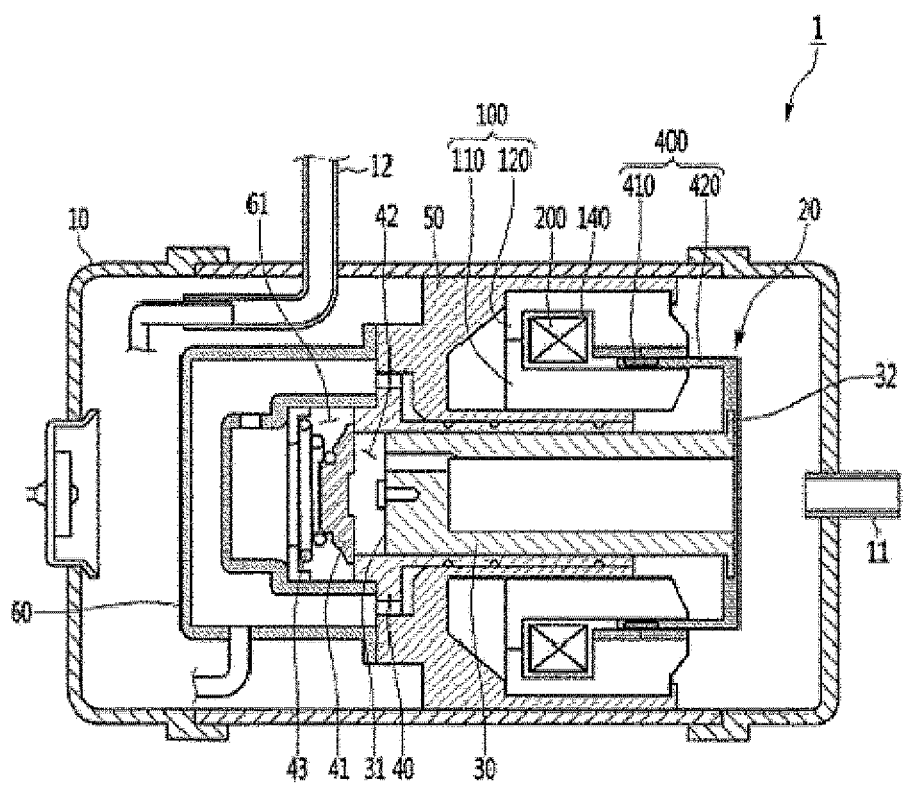
FIG. 30 is a longitudinal sectional view of a reciprocating compressor including a movable core-type reciprocating motor according to an embodiment.

FIG. 30 is a longitudinal sectional view of a reciprocating compressor including a movable core-type reciprocating motor according to an embodiment. Referring to FIG. 30, a reciprocating compressor 1 includes a case 10 having an inner space, a reciprocating motor 20 disposed in an inner space, where mover 400 performs a reciprocation movement, a piston 30 coupled to the mover 400 of the reciprocating motor 20 to perform a reciprocation movement together with the mover 400, a cylinder 40 into which the piston 30 is inserted to form a compression space 42, a suction valve 31 configured to open and close a suction side of the compression space 42, and a discharge valve 41 configured to open and close a discharge side of the compression space 42. A suction pipe 11 may be connected to an inner space of the sealed case 10, and one or a first side of the suction pipe 11 may be connected to a discharge pipe 12 that guides a refrigerant, which is compressed in the compression space 42 of the cylinder 40, which is described hereinafter, to a refrigeration cycle. As a result, the inner space of the case 10 may be filled with a suctioned refrigerant to form a suction pressure, and the refrigerant discharged from the compression space 42 may be discharged to an outside of the case 10 through the discharge pipe 12 toward a condenser.

A frame 50 may be installed in the inner space of the case 10, and the reciprocating motor 20 that generates a reciprocating force and includes a resonance motion of the piston 30, which is described hereinafter, at a same time may be fixedly coupled to one side surface of the frame 50. The compression space 42 may be provided on an inside of the reciprocating motor 20 to be coupled to the cylinder 40 inserted in the frame 50, and the piston 30 reciprocably inserted into the cylinder 40 to change a volume of the compression space 42, and thus, to compress the refrigerant may be coupled to the cylinder 40.

The suction valve 31 that opens and closes the suction passage of the piston 30 may be coupled to a front section of the piston 30 and the discharge valve 41 that opens and closes the compression space 42 of the cylinder 40 may be accommodated in a discharge cover 60 and be detachably coupled to the front section of the cylinder 40. The discharge cover 60 may be fixedly coupled to the cylinder 40 with discharge space 61 provided therein. The discharge valve 41 and a valve spring 43 that supports the discharge valve 41 may be accommodated in the discharge space 61 of the discharge cover 60, and an inlet of a gas bearing for providing lubrication between the cylinder 40 and the piston 30 may be accommodated.

The gas bearing (not shown) may include a gas communication path formed between an inner circumferential surface of the frame 50 and an outer circumferential surface of the cylinder 40, and a plurality of fine gas holes that penetrate from a middle of the gas communication path to the inner circumferential surface of the cylinder 40.

As the reciprocating motor 20 may be formed to have a same configuration as that of FIGS. 1 to 29 described above, the following may refer to the reciprocating motor described above. In this embodiment, inner stator 110 and outer stator 120 are fixed to the frame 50, and mover 400 is connected to the piston 30. Accordingly, when the mover 400 performs a reciprocation movement with respect to the stator 100 and the magnet 300, the piston 30 inserted into the cylinder 40 may perform a reciprocation movement with the mover 400 in both directions.

In the reciprocating compressor 1 according to the above embodiment, when an AC current is applied to the magnet coil 200 of the reciprocating motor 20, an alternating flux is formed between the stator 100 and the magnet 300 and the mover 400, and in the direction in which the flux by the magnet coil 200 and the flux by the magnet 300 are increased, the mover 400 and the piston 30 connected thereto are continuously moved to perform a reciprocation movement. A reciprocating centering force to restore in the direction where the magnetic energy is low is accumulated between the mover 400 and the stator 100 of the reciprocating motor and the magnet 300. In this state, when the direction of the current applied to the magnet coil 200 is changed, the mover 400 and the piston 30 connected thereto move in opposite directions due to the accumulated reciprocating centering force and the magnetic force by fluxes of the magnet coil 200 and the magnet 300, and at this time, a reciprocating centering force to restore in the direction where the magnetic energy is low is accumulated between the mover 400 and the stator 100 of the reciprocating motor and the magnet 300.

In this way, the mover 400 and the piston 30 continuously repeat a reciprocation movement that moves alternately between right and left sides in the drawing, such as in a mechanical resonance spring. While the mover 400 performs a reciprocation movement in the reciprocating motor, a magnetic resonance spring is formed between the mover 400 and the stator 100 and the magnet 300, thereby inducing the resonance movement of the mover 400 and the piston 30. Therefore, the piston 30 may compress the refrigerant while overcoming the gas force generated in the compression space 42.

The reciprocating compressor according to this embodiment has the action effect according to the reciprocating motor of FIGS. 1 to 29 described above. Therefore, this refers to the reciprocating motor described above.

The reciprocating compressor of the this embodiment may include a reciprocating motor which is reduced in size and weight so that it may be made compact and light in weight. Therefore, installation of the compressor is easy, and maintenance and repair are also advantageous.

In addition, a reciprocating motor manufactured easily and with improved structural stiffness is provided, so that in a same manner, the compressor may be easily manufactured and its structural stiffness may be improved. Also, by reducing the weight of the mover and minimizing the magnetic air gap of the mover, stator and magnet, as the motor operates at high speed and the motor efficiency is improved, efficiency of the compressor may also be increased.

Figure 31:
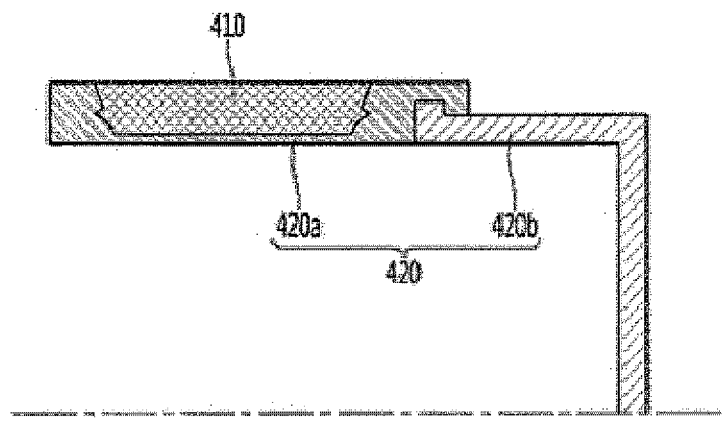
FIG. 31 is a cross-sectional view showing a mover of a reciprocating compressor and a piston according to another embodiment.
Figure 32:
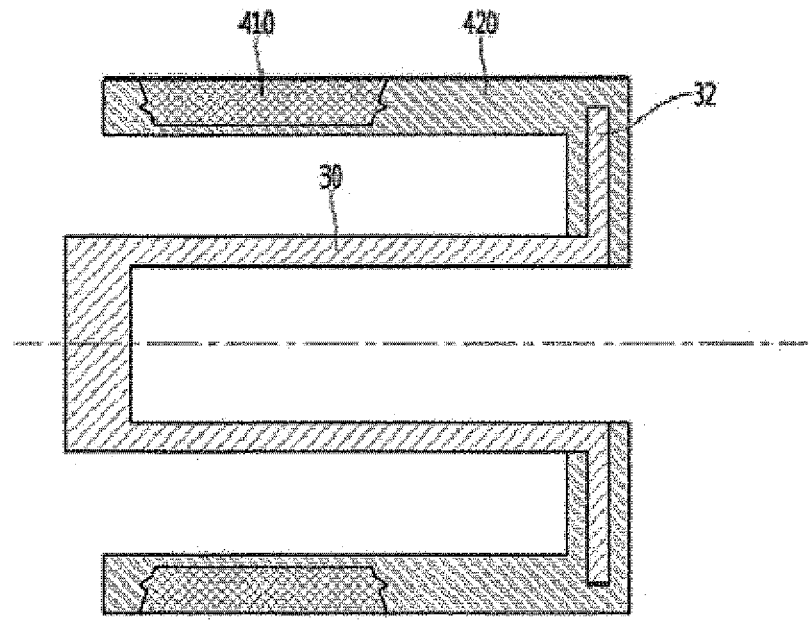
FIG. 32 is a cross-sectional view showing a mover of a reciprocating compressor and a piston according to another embodiment.

FIG. 31 is a cross-sectional view showing a mover and a piston of a reciprocating compressor according to another embodiment. FIG. 32 is a cross-sectional view showing a mover and a piston of a reciprocating compressor according to another embodiment.

Referring to FIG. 31, connection member 420 may include a first connection member 420a connected to the movable core 410 and a second connection member 420b connecting the first connection member 420a and the piston 30. When the connection member 420 includes the first connection member 420a and the second connection member 420b, after connecting the first connection member 420a and the movable core 410 and connecting the second connection member 420b and the piston 30, the piston 30 and the movable core 410 may be integrally connected by a process of connecting the first and second connection members 420a and 420b. Therefore, compared with the method of directly connecting the piston 30 to the connection member 420 connected to the movable core 410, the movable core 410 and the piston 30 may be connected more easily.

In this embodiment, the first connection member 420a and the second connection member 420b may be made of different materials. For example, the first connection member 420a may be made of glass fiber, and the second connection member 420b may be made of plastic or a mixture of glass fiber and plastic.

As the glass fiber is a non-magnetic and non-conductive material, when the first connection member 420a is made of a material including glass fiber, a stiffness of the connection member 420 may be ensured and eddy loss in the mover 400 may be reduced. The glass fiber may be integrally fixed to the movable core 410 through heating and curing processes.

Further, when the second connection member 420b is formed of a material including plastic, the second connection member 420b and the piston 30 may be injection-molded integrally, and when the second connection member 420b is formed of a mixed material of plastic and glass fiber, injection molding may be performed and the stiffness of the second connection member 420b may be ensured like the first connection member 420a. In addition, referring to FIG. 32, the connection member 420 and the piston 30 may be integrally formed through insert injection. For example, the connection member 420 may be made of plastic or a mixture of plastic and glass fiber.

In the conventional case, the magnet 300 is provided in the mover 400, making it difficult to manufacture the magnet together with the piston due to the problems of magnetic force and magnetism. On the other hand, in the case of embodiments disclosed herein, as the magnet 300 is fixed to the stator 100 and only the movable core 410 is provided in the mover 400, the piston 30 and the mover 400 may be injection-molded integrally.

A flange 32 may be formed at a rear end of the piston 30 opposite to the front end where the suction valve 31 is formed. Insert injection may be performed to allow the flange 32 to be filled in the connection member 420 so that the piston 30 and the mover 400 may be integrally formed.

When the piston 30 and the mover 400 are integrally injection molded as described above, the coupling force between the mover 400 and the piston 30 may be secured, and the process for connecting the mover 400 and the piston 30 with bolts, for example, may be omitted, so that workability may be enhanced. In addition, as components, such as bolts, are omitted to reduce loads applied to the mover 400 and the piston 30, the efficiency of the motor may be further improved, and noise and vibration due to omission of the assembly portion may be reduced.

Figure 33:
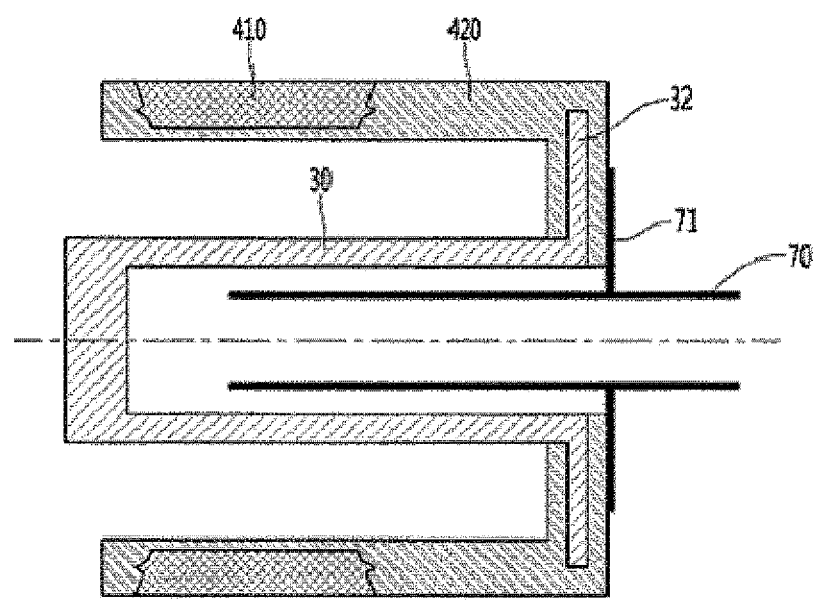
FIG. 33 is a cross-sectional view showing a mover of a reciprocating compressor, a piston, and a muffler according to another embodiment.

FIG. 33 is a cross-sectional view showing a mover of a reciprocating compressor, a piston, and a muffler according to another embodiment. Referring to FIG. 33, the piston 30 may have a muffler 70 in its inner side, and the muffler 70 may be attached to the outer surface of the connection member 420 in a fusion or bonding manner through dielectric heating, for example.

Generally, the muffler 70 connected to the piston 30 to reduce noise generated from the refrigerant suctioned through the suction pipe 11 may be installed at the compressor 1. The refrigerant suctioned through the suction pipe 11 may flow into the piston 30 through the muffler 70. For example, in the process that the refrigerant passes through the muffler 70, the flow noise of the refrigerant may be reduced.

As described above, when the muffler 70 is attached to the connection member 420, as components, such as bolts, are omitted to reduce loads applied to the mover 400, efficiency of the motor may be further improved, and noise and vibration due to omission of the assembly portion may be reduced.

The flange 71 may be formed at a rear end of the muffler 70, and the flange 71 may be attached to the outer surface of the connection member 420. As another example, insert injection may be performed to allow the flange 71 formed at the rear end of the muffler 70 to be filled in the connection member 420 so that the piston 30 and the muffler 70 may be integrally formed with the mover 400. When the muffler 70, the piston 30, and the mover 400 are integrally injection molded as described above, the coupling force between the mover 400, the piston 30, and the muffler 70 may be secured, and the process for connecting the mover 400 and the muffler 70 with bolts, for example, may be omitted, so that workability may be enhanced. Further, as the muffler 70, the piston 30, and the mover 400 are integrally formed, it is advantageous in tolerance management. In addition, as the air gap is uniform due to advantageous tolerance management and the mover 400 reduces the eccentricity from the stator 100 and magnet 300 to a minimum, the mover 400 may not rotate and may perform a reciprocation movement on a straight line.

The aforementioned embodiments may be implemented by applying a linear motor having a single air gap as one end of an outer stator and one end of an inner stator in an axial direction on the basis of a coil are connected to each other. However, the aforementioned embodiments may be also implemented by applying a linear motor having two or more air gaps as two ends of an outer stator and two ends of an inner stator in an axial direction on the basis of a coil are separated from each other, each air gap provided with a magnet. In this case, the basic configuration and effects are the same as those of the previous embodiments. Therefore, detailed descriptions thereof have been omitted.

Therefore, embodiments disclosed herein provide a reciprocating motor capable of using all the resonance frequencies within the operation frequency. Embodiments disclosed herein provide a reciprocating motor capable of miniaturizing a size of a motor in axial and radial directions.

Embodiments disclosed herein provide a reciprocating motor capable of increasing motor efficiency by reducing power consumption through weight reduction of the mover, and allowing high-speed operation by increasing operation frequency. Embodiments disclosed herein further provide a reciprocating motor capable of increasing motor output by increasing a magnitude of the magnet while maintaining a size of the mover. Embodiments disclosed herein also provide a reciprocating motor in which a length of the mover is reduced and a magnetic air gap due to tolerance is kept minimally.

Embodiments disclosed herein provide a reciprocating motor in which the movable core is exposed to an air gap to further reduce the magnetic air gap between the magnet and the stator and the movable core. Embodiments disclosed herein additionally provide a reciprocating motor capable of maximizing a stiffness of a motor spring by a reduced magnetic air gap.

Embodiments disclosed herein provide a reciprocating motor in which a movable core is not released during reciprocation movement of a mover even when a separate coating layer is not provided for fixing the movable core. Embodiments disclosed herein also provide a reciprocating motor for reducing manufacturing costs with an easily manufactured stator and mover.

Embodiments disclosed herein provide a miniaturized and light reciprocating compressor with a reduced size of a reciprocating motor. Embodiments disclosed herein further provide a reciprocating motor in which as a mover of a reciprocating motor, a piston, and a muffler are integrally formed to increase workability and coupling force, it is advantageous for tolerance management, and as air gap is made uniform, the eccentricity of the mover is kept minimally.

Embodiments disclosed herein provide a movable core-type reciprocating motor that may include a stator including an inner stator and an outer stator, wherein one or first sides of an axial direction of the inner stator and the outer stator are connected to each other and the other or second sides of the axial direction are spaced from each other to form an air gap; a magnet coil disposed between the inner stator or the outer stator; a magnet fixed to at least one of the inner stator and the outer stator so as to be at least partially positioned within a range of the air gap; and a mover including a movable core disposed in the air gap and made of a magnetic material to perform a reciprocation movement with respect to the stator and the magnet and a connection member made of a non-magnetic material and configured to support the movable core. A motor efficiency may be improved by reducing power consumption through a reduced weight of the mover, and as the movable core is exposed to the air gap, a magnetic air gap of the movable core, the magnet, and the stator may be kept to a minimum.

The connection member may have a filling groove formed to be recessed to the inner surface in the inner circumferential surface or the outer circumferential surface, and the movable core may be at least partially filled in the filling groove. Accordingly, as the coupling force between the movable core and the connection member is improved, the movable core may be prevented from being detached from the connection member during a reciprocation movement of the mover, and as a thickness of the mover is reduced to reduce a size of the air gap, a magnetic spring stiffness of the mover may be increased. The movable core may penetrate the connection member so as to be exposed to the inner and outer sides of the connection member and be fixed. Accordingly, the air gap may become further smaller by a thickness of the omitted connection member, and the magnetic spring stiffness of the mover may be further increased in proportion to the size of the reduced air gap.

The exposed surface exposed to the inner or outer side of the connection member may be disposed on a straight line with the inner circumferential surface or the outer circumferential surface of the connection member. Accordingly, it is possible to prevent the movable core from colliding with the stator or the magnet during the reciprocation movement process of the mover.

In addition, the movable core and the connection member may be integrally formed through insert injection. Accordingly, work for fixing the movable core to the connection member may be omitted, which improves workability and improves a coupling force between the movable core and the connection member, so that it is advantageous for tolerance management.

The connection member may include a glass fiber. Accordingly, the stiffness of the connection member may be ensured, and an eddy current loss in the mover may be reduced.

The movable core may be formed by radially laminating a first segment arranged in parallel to a reciprocating direction of the movable core along a circumferential direction of the connection member. Accordingly, an eddy current may be reduced.

The first segment may include a fixing protrusion that protrudes toward the inner side of the connection member on at least one side surface contacting the connection member. Accordingly, a coupling force between the first segment and the connection member may be increased, so that the first segment may be stably maintained in the fixed state without being detached from the connection member.

Further, at least one hole may be perforated in the first segment. Accordingly, as a weight of the first segment is reduced, a weight of the mover as a whole may be reduced.

Moreover, in the first segment, a length of the exposed surface exposed to the inner or outer of the connection member may be formed to be shorter than a length of the contact surface contacting the connection member. Accordingly, even when no fixing protrusion or fixing groove is formed in the first segment, a coupling force between the first segment and the connection member may increase, so that the first segment may be stably maintained in the fixed state without being detached from the connection member.

In addition, the first segment may have a protrusion part that protrudes in parallel with a lamination direction and a recessed groove part or groove. Accordingly, when a plurality of first segments is laminated, the protrusion part may be inserted to the groove part during the lamination, so that the laminating operation may be facilitated and the coupling force between the plurality of first segments secured. As a result, a laminated shape may not be disturbed and a laminated state may be firmly maintained.

The movable core may be formed by laminating a second segment arranged in parallel with a circumferential direction of the connection member in a reciprocating direction of the movable core. At least one lamination hole may be perforated in the second segment and the connection member may have a lamination protrusion formed in parallel with the lamination direction of the second segment. The second segment may be laminated while the lamination protrusion is inserted into the lamination hole. Accordingly, as a weight of the second segment is reduced, a weight of the mover as a whole may be reduced. The lamination of the second segment may be made easier, and also a coupling force between the second segment and the connection member may be improved.

Further, the second segment may have a protrusion part or protrusion that protrudes in parallel to the lamination direction and a recessed groove part or groove. Accordingly, when a plurality of second segments is laminated, the protrusion part may be inserted into the groove part during the lamination, so that an lamination operation may be easily performed.

The movable core may be formed by laminating second segments, which are connected continuously to allow the arc-shaped second segments to be circular, in a reciprocating direction of the movable core. Accordingly, as the second segments of the entire circumferential direction are laminated at once, workability may be improved and a coupling force between the second segments may be ensured, so that a structural strength of the movable core may be improved.

The movable core may be formed by winding a second segment band, where the arc-shaped second segments are connected continuously, on the connection member. Accordingly, the second segment band, which is a length material, may be manufactured through an operation, such as punching, and the second segment may be laminated by a desired thickness by merely winding it on the connection member, so that workability may be improved.

Embodiments disclosed herein also provide a reciprocating compressor that may include a case having an inner space; a reciprocating motor disposed in an inner space of the case, wherein a mover of the reciprocating mover performs a reciprocation movement; a piston coupled to the reciprocating motor to perform the reciprocation movement together with the mover; a cylinder into which the piston is inserted to form a compression space; a suction valve configured to open and close a suction side of the compression space; and a discharge valve configured to open and close a discharge side of the compression space. The reciprocating motor may include the movable core-type reciprocating motor. Accordingly, as a miniaturized, lightweight reciprocating motor is provided, the reciprocating compressor may be miniaturized and lightweight.

The connection member and the piston may be integrally formed through insert injection. Accordingly, as a coupling force between the mover and the piston is ensured, and a process of connecting the mover and the piston with bolts, for example, may be omitted, workability may be increased, and as omission of parts, such as bolts, reduces a load on the mover and piston, efficiency of the motor may be further improved and noise and vibration due to omission of the assembly part may be reduced.

In addition, the piston may have a muffler on an inner side, and the muffler may be attached to the outer surface of the connection member by a fusion bonding method or a bonding method through dielectric heating. Accordingly, as a coupling force between the mover and the piston and the muffler is further secured and a process for connecting the mover and the muffler with bolts is omitted, workability may be increased, and as the muffler and the piston and the mover are integrally formed, it is advantageous for tolerance management. In addition, as the air gap is uniform due to advantageous tolerance management and the mover reduces eccentricity from the stator and magnet to a minimum, the mover may not rotate and may perform a reciprocation movement on a straight line.

According to embodiments disclosed herein, by resonating the mover with the magnetic resonance spring, it is possible to prevent the use frequency from being limited within the operation frequency of a certain section, so that efficiency of the motor may be improved. According to embodiments disclosed herein, by resonating the mover with the magnetic resonance spring, it is possible to reduce the number of parts for resonating the mover and further reduce a lateral length of the motor.

According to embodiments disclosed herein, by resonating the mover with the magnetic resonance spring, it is possible to prevent the mover from being eccentric due to a lateral force of the resonance spring, thereby reducing friction loss and noise. According to embodiments disclosed herein, a weight of the mover may be reduced by coupling the magnet to the end of the stator and this may increase the efficiency of the motor by lowering power consumption. The operation frequency may be increased for high-speed operation.

According to embodiments disclosed herein, the movable core may be exposed to an air gap to further reduce the magnetic air gap between the magnet and the stator and the movable core. According to embodiments disclosed herein, the stator and the mover may be manufactured easily to reduce manufacturing costs.

According to embodiments disclosed herein, as the reciprocating motor is provided, the reciprocating compressor may be miniaturized and lightweight. According to the present invention, it is possible to obtain the effect of improving the efficiency of the compressor and reducing noise.

According to embodiments disclosed herein, as a mover of a reciprocating motor, a piston, and a muffler are integrally formed to increase workability and coupling force, it is advantageous for tolerance management, and as air gap is made uniform, eccentricity of the mover is kept minimally.

Further, it is apparent that various effects understood by the respective constitutions shown in embodiments may be obtained.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A movable core-type reciprocating motor, the motor comprising: a stator comprising an inner stator and an outer stator, the stator formed in a cylindrical shape by radially laminating a plurality of core blocks or cores; a magnet coil disposed between the inner stator or the outer stator; a magnet fixed to the outer stator so as to be at least partially positioned within a range of an air gap; and a cylindrically shaped mover comprising at least one movable core disposed in the air gap and made of a magnetic material to perform a linear reciprocation movement with respect to the stator and the magnet and a connection member made of a non-magnetic material configured to support the at least one movable core, wherein the at least one movable core comprises a plurality of segments arranged in a circumferential direction and the plurality of segments is laminated in an axial direction or the at least one movable core comprises a plurality of segments arranged in the axial direction and the plurality of segments is radially laminated along the circumferential direction of the connection member, wherein at least one lamination hole is formed in each of the plurality of segments, and a lamination protrusion is inserted into the at least one lamination hole, and wherein the lamination protrusion integrally extends from the connection member along a lamination direction of the plurality of segments.

2. The motor of claim 1, wherein lengths of first and second side surfaces in a radial direction are differently formed for each of the plurality of segments.

3. The motor of claim 1, wherein the plurality of segments each is formed in an arc shape, and wherein the plurality of segments is spaced a predetermined interval from each other along the circumferential direction.

4. The motor of claim 1, wherein the magnet and the magnet coil are spaced apart from each other in the axial direction.

5. The motor of claim 4, wherein magnet poles of the magnet are arranged in the axial direction.

6. The motor of claim 1, wherein a groove or a hole is formed in the connection member, and the at least one movable core is insertedly coupled to the groove or the hole of the connection member, and wherein at least one side of an inner circumferential surface or an outer circumferential surface of the at least one movable core is exposed through the groove or the hole.

7. The motor of claim 6, wherein the at least one movable core includes a plurality of movable cores spaced along the circumferential direction of the connection member.

8. The motor of claim 6, wherein an exposed surface of the movable core exposed at an inner or outer side of the connection member is disposed in a straight line with the inner circumferential surface or the outer circumferential surface of the connection member.

9. A reciprocating compressor, comprising: a case having an inner space; a reciprocating motor disposed in the inner space of the case, where a cylindrically shaped mover of the reciprocating motor performs a linear reciprocation movement; a piston coupled to the mover of the reciprocating motor to perform the reciprocation movement together with the mover; a cylinder into which the piston is inserted to form a compression space; a suction valve configured to open and close a suction side of the compression space; and a discharge valve configured to open and close a discharge side of the compression space, wherein the reciprocating motor comprises: a stator comprising an inner stator and an outer stator, wherein first sides in an axial direction of the inner stator and the outer stator are connected to each other and second sides in the axial direction are spaced from each other to form an air gap; a magnet coil disposed between the inner stator and the outer stator; a magnet fixed to the outer stator so as to be at least partially positioned within a range of the air gap; and the mover comprising at least one movable core disposed in the air gap and made of a magnetic material to perform the reciprocation movement with respect to the stator and the magnet and a connection member configured to support the at least one movable core, wherein the at least one movable core comprises a plurality of segments laminated in the axial direction, wherein the plurality of segments each is formed in an arc shape, wherein the plurality of segments is connected with each other in a circumferential direction to form a circular segment ring or a circular segment band wound in the circumferential direction, and wherein the plurality of segments have a length of an inner circumferential surface less than a length of an outer circumferential surface, such that a cutout portion is formed between the inner circumferential surfaces of the plurality of segments.

10. The reciprocating compressor of claim 9, wherein the connection member is made of a non-magnetic material.

11. The reciprocating compressor of claim 9, wherein the second sides in the axial direction of the inner stator and the outer stator are spaced from each other in a radial direction of the inner stator to form the air gap.

12. The reciprocating compressor of claim 9, wherein the connection member comprises:
    a first connection member connected to the at least one movable core; and
    a second connection member that connects the first connection member and the piston.

13. The reciprocating compressor of claim 12, wherein the first connection member and the second connection member are made of different materials.

14. The reciprocating compressor of claim 13, wherein the first connection member is made of glass fiber, and the second connection member is made of plastic or a mixture of glass fiber and plastic.

15. A movable core-type reciprocating motor, the motor comprising: a stator comprising an inner stator and an outer stator, the stator formed in a cylindrical shape by radially laminating a plurality of core blocks or cores; a magnet coil disposed between the inner stator or the outer stator; a magnet fixed to the outer stator so as to be at least partially positioned within a range of an air gap; and a cylindrically shaped mover comprising at least one movable core disposed in the air gap and made of a magnetic material to perform a linear reciprocation movement with respect to the stator and the magnet and a connection member made of a non-magnetic material configured to support the at least one movable core, wherein the at least one movable core comprises a plurality of segments arranged in a circumferential direction and the plurality of segments is laminated in an axial direction or the at least one movable core comprises a plurality of segments arranged in the axial direction and the plurality of segments is radially laminated along the circumferential direction of the connection member, and wherein the plurality of segments each comprises a fixing protrusion or fixing groove formed on at least one side surface directly contacting the connection member.

16. The motor of claim 15, wherein first sides in the axial direction of the inner stator and the outer stator are connected to each other and second sides in the axial direction of the inner stator and the outer stator are spaced from each other in a radial direction of the inner stator to form the air gap.

17. The motor of claim 15, wherein first sides in the axial direction of the inner stator and the outer stator are connected to each other and second sides in the axial direction are spaced from each other to form the air gap.

18. The motor of claim 17, wherein the second sides in the axial direction of the inner stator and the outer stator are spaced from each other in a radial direction of the inner stator to form the air gap.

* * * * *